US012666264B2

(12) United States Patent
Chen et al.

(10) Patent No.: US 12,666,264 B2
(45) Date of Patent: Jun. 23, 2026

(54) METHOD AND APPARATUS FOR PROVIDING CONFIGURATION FOR SERVING TERMINAL DEVICE

(71) Applicant: Telefonaktiebolaget LM Ericsson (publ), Stockholm (SE)

(72) Inventors: Ping Chen, Shanghai (CN); Wenliang Xu, Shanghai (CN); Tianmei Liang, Shanghai (CN); Emiliano Merino Vazquez, Madrid (ES); Antonio Iniesta Gonzalez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 321 days.

(21) Appl. No.: 18/551,397

(22) PCT Filed: Mar. 14, 2022

(86) PCT No.: PCT/CN2022/080639
§ 371 (c)(1),
(2) Date: Sep. 19, 2023

(87) PCT Pub. No.: WO2022/199411
PCT Pub. Date: Sep. 29, 2022

(65) Prior Publication Data
US 2024/0196216 A1 Jun. 13, 2024

(30) Foreign Application Priority Data
Mar. 20, 2021 (WO) ................ PCT/CN2021/081936

(51) Int. Cl.
*H04W 12/08* (2021.01)
*H04W 4/50* (2018.01)
(52) U.S. Cl.
CPC ............. *H04W 12/08* (2013.01); *H04W 4/50* (2018.02)

(58) Field of Classification Search
CPC ................................ H04W 12/08; H04W 4/50
(Continued)

(56) References Cited

U.S. PATENT DOCUMENTS

2018/0192471 A1* 7/2018 Li .......................... H04W 80/10
2019/0090298 A1* 3/2019 Abraham .............. H04W 76/27
(Continued)

FOREIGN PATENT DOCUMENTS

CN 112219383 A 1/2021
WO 2020090764 A1 5/2020
WO 2021/017381 A1 2/2021

OTHER PUBLICATIONS

European Search Report and Search Opinion, EP App. No. 22774073.5, Nov. 19, 2024, 9 pages.
(Continued)

*Primary Examiner* — Mark G. Pannell
(74) *Attorney, Agent, or Firm* — Nicholson De Vos Webster & Elliott LLP

(57) ABSTRACT

A method and an apparatus for providing configuration for serving terminal device. A first aspect of the present disclosure provides a method performed by a first network function. The method may comprise: transmitting to a second network function a request for providing at least one service parameter for a user equipment (UE) or a group of UEs, and receiving from the second network function a response about whether the request is authorized. After a first network function transmits a request for providing at least one service parameter for a terminal device, the first network function may be aware about whether the request is authorized.

19 Claims, 19 Drawing Sheets

(58) Field of Classification Search
    USPC ........................................................ 455/411
    See application file for complete search history.

(56)                    References Cited

U.S. PATENT DOCUMENTS

| | | | | |
|---|---|---|---|---|
| 2020/0053083 | A1 | 2/2020 | Kunz et al. | |
| 2020/0112884 | A1* | 4/2020 | Kweon | H04W 76/11 |
| 2020/0145876 | A1 | 5/2020 | Dao et al. | |
| 2020/0252837 | A1* | 8/2020 | Kim | H04M 15/8044 |
| 2020/0322881 | A1* | 10/2020 | Lee | H04W 4/70 |
| 2020/0344576 | A1* | 10/2020 | Li | H04W 4/06 |
| 2020/0404106 | A1* | 12/2020 | Belling | H04W 8/10 |
| 2021/0058748 | A1* | 2/2021 | Liao | H04W 76/11 |
| 2021/0168584 | A1* | 6/2021 | Li | H04W 28/16 |
| 2021/0256159 | A1* | 8/2021 | Ninglekhu | H04W 4/70 |

OTHER PUBLICATIONS

Nokia et al., "Exposure of Time synchronization as a service—procedure," Feb. 24-Mar. 9, 2021, 21 pages, 3GPP TSG-SA2 Meeting #143E, S2-2102033.

Nokia, "Support of AF guidance to PCF determination of proper URSP rules," Feb. 24-Mar. 9, 2021, 20 pages, SA WG2 Meeting #143e, S2-2100085.

Office Action, JP App. No. 2023-557172, Sep. 6, 2024, 5 pages of Original document only.

Decision to Grant, JP App. No. 2023-557172, Mar. 28, 2025, 05 pages (02 pages of English Translation and 03 pages of Original Document).

Ericsson, "Support for Service Specific Authorization", S2-2102193, SA WG2 Meeting #144e, Apr. 12-Apr. 16, 2021, 6 pages.

International Search Report and Written Opinion, Application No. PCT/CN2022/080639, May 30, 2022, 9 pages.

International Preliminary Report on Patentability, Application No. PCT/CN2022/080639, Jul. 6, 2023, 7 pages.

3GPP TR 23.748 V2.0.0, "3rd Generation Partnership Project; Technical Specification Group Services and System Aspects; Study on enhancement of support for Edge Computing in 5G Core network (5GC) (Release 17)," Nov. 2020, 250 pages, 3GPP Organizational Partners.

3GPP TS 23.501 V16.2.0, "3rd Generation Partnership Project; Technical Specification Group Services and System Aspects; System Architecture for the 5G System (5GS); Stage 2 (Release 16)," Sep. 2019, 391 pages, 3GPP Organizational Partners.

3GPP TS 23.501 V16.6.0, "3rd Generation Partnership Project; Technical Specification Group Services and System Aspects; System architecture for the 5G System (5GS); Stage 2 (Release 16)," Sep. 2020, 447 pages, 3GPP Organizational Partners.

3GPP TS 23.502 V16.6.0, "3rd Generation Partnership Project; Technical Specification Group Services and System Aspects; Procedures for the 5G System (5GS); Stage 2 (Release 16)," Sep. 2020, 597 pages, 3GPP Organizational Partners.

3GPP TS 23.503 V16.6.0, "3rd Generation Partnership Project; Technical Specification Group Services and System Aspects; Policy and charging control framework for the 5G System (5GS); Stage 2 (Release 16)," Sep. 2020, 118 pages, 3GPP Organizational Partners.

Ericsson, "Application Identifier for NEF API Chargeble Party and AF Session with QoS," Feb. 24-Mar. 9, 2021, 9 pages, 3GPP TSG-SA2 Meeting # 143E, S2-2100294, Elbonia, E-Meeting.

* cited by examiner

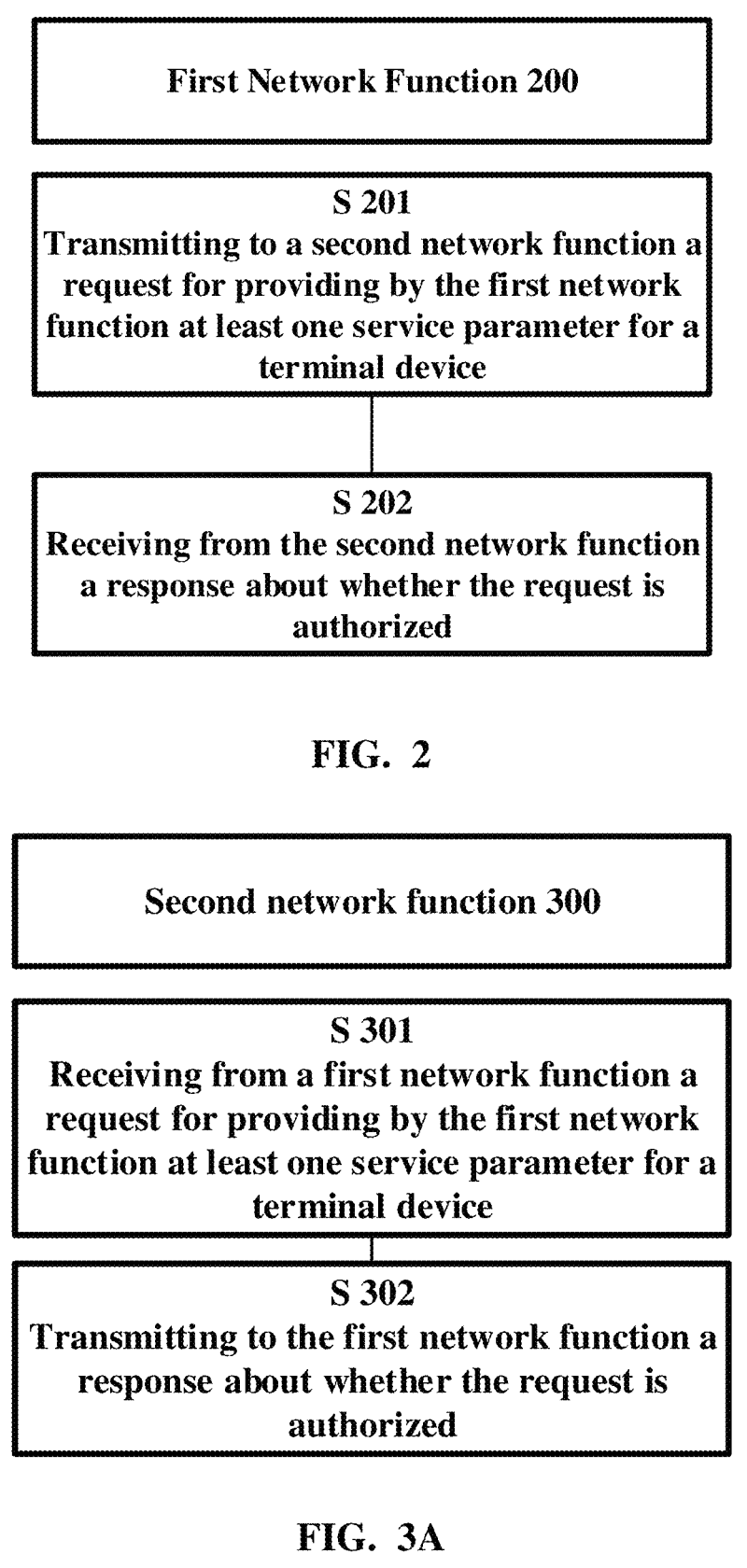

First Network Function 200

S 201
Transmitting to a second network function a request for providing by the first network function at least one service parameter for a terminal device S 202
Receiving from the second network function a response about whether the request is authorized

FIG. 2

Second network function 300

S 301
Receiving from a first network function a request for providing by the first network function at least one service parameter for a terminal device S 302
Transmitting to the first network function a response about whether the request is authorized

FIG. 3A

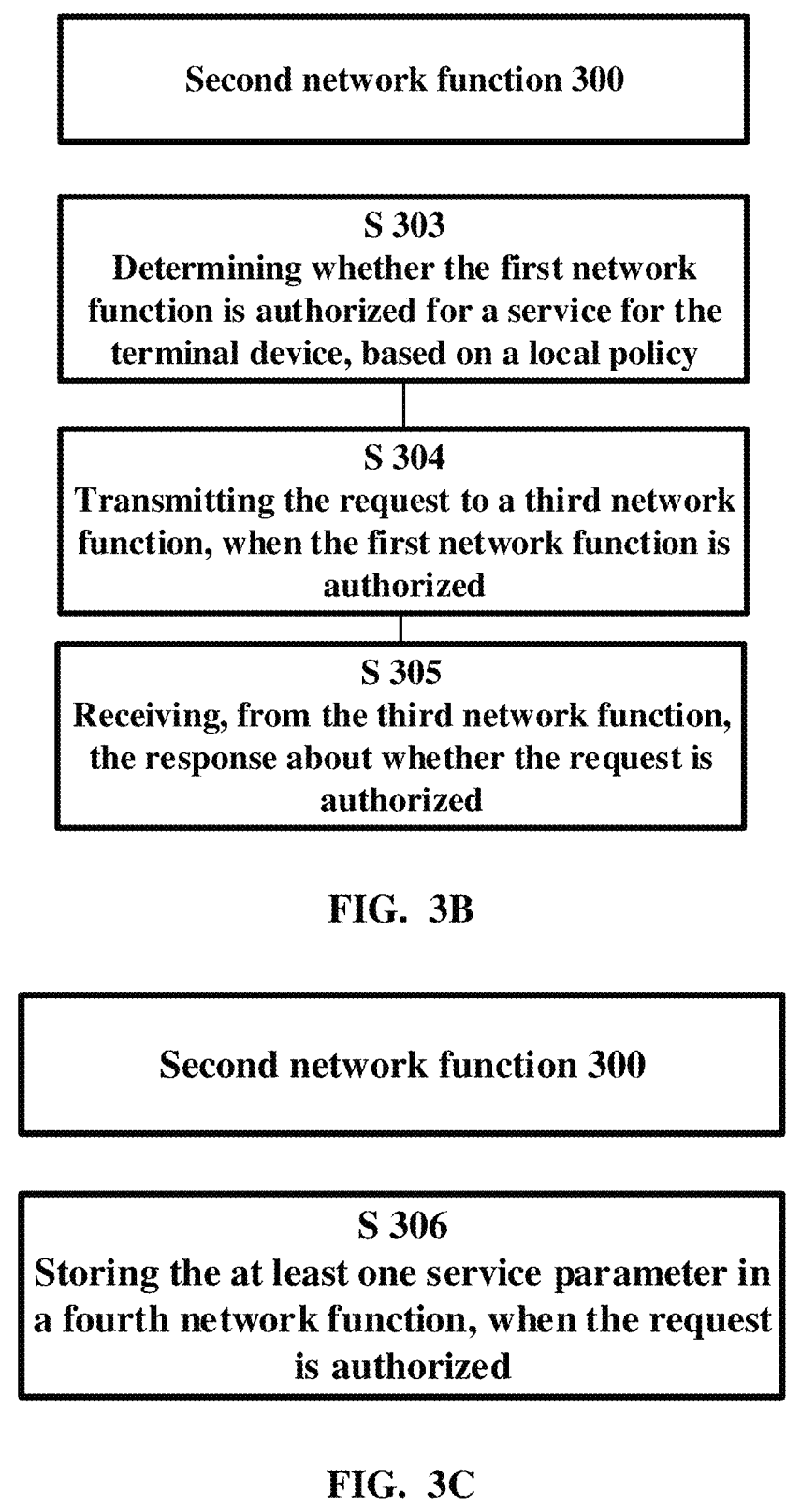

```
┌─────────────────────────────────────────────┐
│                                               │
│        Second network function 300            │
│                                               │
└─────────────────────────────────────────────┘

┌─────────────────────────────────────────────┐
│                   S 303                       │
│     Determining whether the first network     │
│  function is authorized for a service for the │
│    terminal device, based on a local policy   │
└─────────────────────────────────────────────┘

┌─────────────────────────────────────────────┐
│                   S 304                       │
│   Transmitting the request to a third network │
│  function, when the first network function is │
│                 authorized                    │
└─────────────────────────────────────────────┘

┌─────────────────────────────────────────────┐
│                   S 305                       │
│   Receiving, from the third network function, │
│   the response about whether the request is   │
│                 authorized                    │
└─────────────────────────────────────────────┘
```

FIG. 3B

```
┌─────────────────────────────────────────────┐
│                                               │
│        Second network function 300            │
│                                               │
└─────────────────────────────────────────────┘

┌─────────────────────────────────────────────┐
│                   S 306                       │
│  Storing the at least one service parameter in│
│ a fourth network function, when the request   │
│                 is authorized                 │
└─────────────────────────────────────────────┘
```

FIG. 3C

Figure 3D:
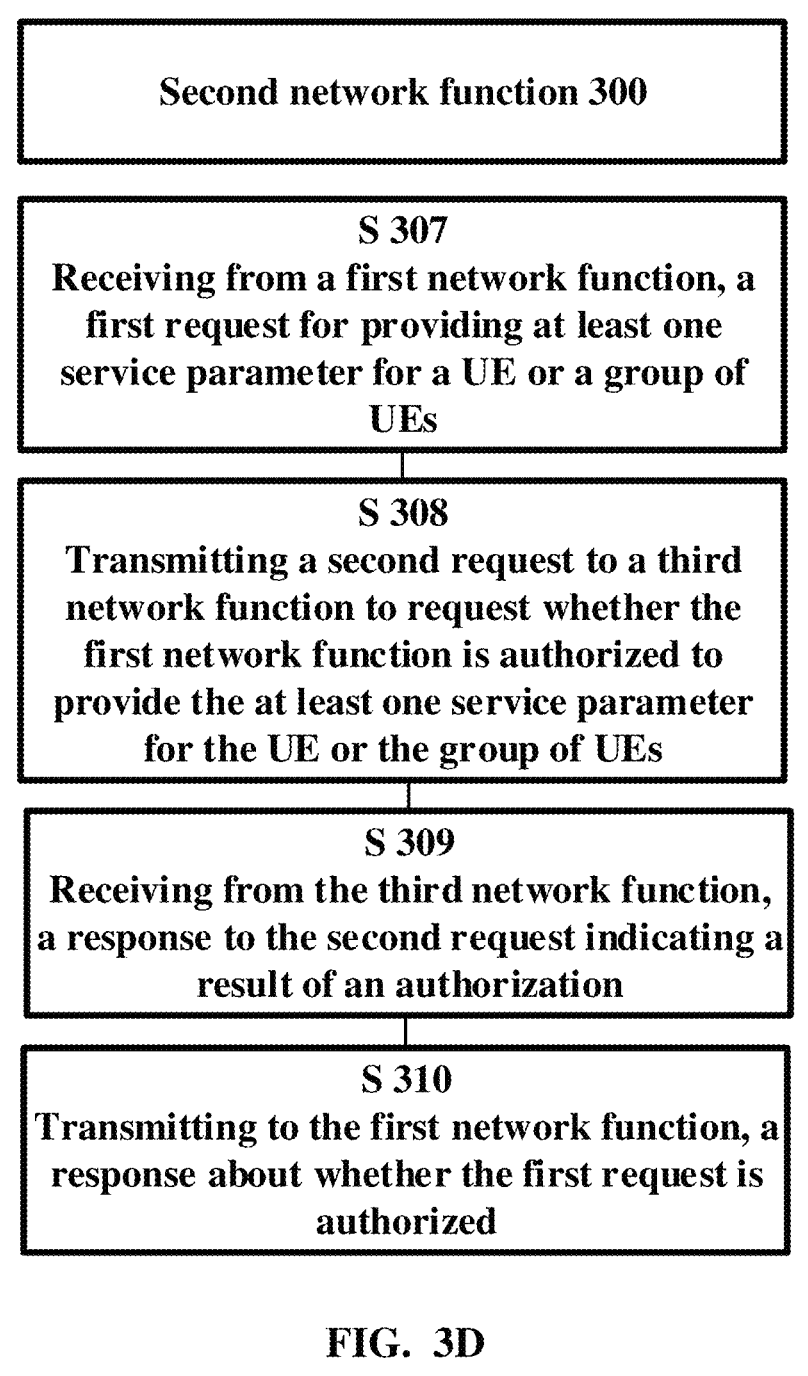

Second network function 300

S 307
Receiving from a first network function, a first request for providing at least one service parameter for a UE or a group of UEs S 308
Transmitting a second request to a third network function to request whether the first network function is authorized to provide the at least one service parameter for the UE or the group of UEs S 309
Receiving from the third network function, a response to the second request indicating a result of an authorization S 310
Transmitting to the first network function, a response about whether the first request is authorized

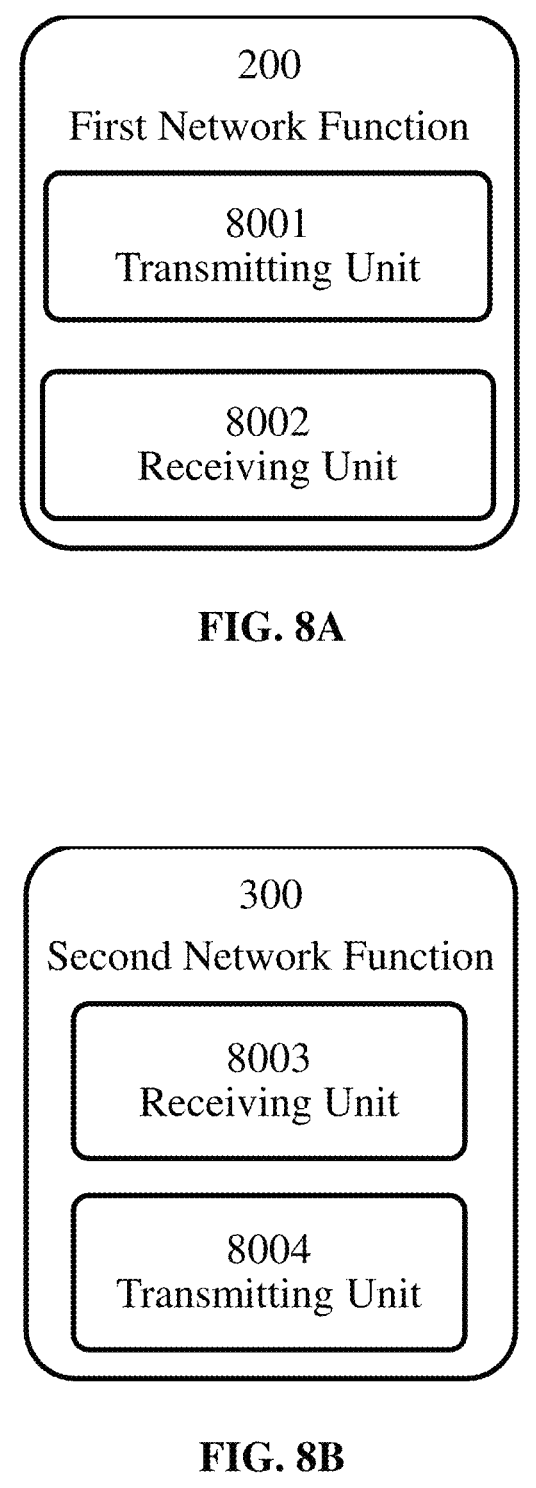

200
First Network Function

8001
Transmitting Unit

8002
Receiving Unit

FIG. 8A

300
Second Network Function

8003
Receiving Unit

8004
Transmitting Unit

FIG. 8B

400
Third Network Function

8005
Receiving Unit

8006
Transmitting Unit

FIG. 8C

METHOD AND APPARATUS FOR PROVIDING CONFIGURATION FOR SERVING TERMINAL DEVICE

CROSS-REFERENCE TO RELATED APPLICATIONS

This application is a National stage of International Application No. PCT/CN2022/080639, filed Mar. 14, 2022, which claims priority to International Application No. PCT/CN2021/081936, filed Mar. 20, 2021, which are hereby incorporated by reference.

TECHNICAL FIELD

The present disclosure relates generally to the technology of communication system, and in particular, to a method and an apparatus for providing configuration for serving terminal device.

BACKGROUND

This section introduces aspects that may facilitate better understanding of the present disclosure. Accordingly, the statements of this section are to be read in this light and are not to be understood as admissions about what is in the prior art or what is not in the prior art.

In a communication network, a terminal device may be served by a network function, via a connection established directly or indirectly (over an access network and core network, and/or over other terminal devices).

Usually, the configuration of the service (such as configuration about the communication resources for establishing the connection, which may influence the service quality from the server to the terminal device) may be determined based on subscription information of the terminal device already stored in the communication network.

In some scenario, the network function may also want/need to provide configuration to the core network for influencing establishment of the above connection, and/or the service for terminal device, etc.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. Various embodiments which address one or more of the issues disclosed herein may be proposed. According to embodiments of the present disclosure, a method and an apparatus may be utilized for providing configuration for serving a terminal device.

A first aspect of the present disclosure provides a method performed by a first network function. The method may comprise: transmitting to a second network function a request for providing at least one service parameter for a UE or a group of UEs, and receiving from the second network function a response about whether the request is authorized.

In embodiments of the present disclosure, the request may be authorized, when the at least one service parameter belongs to subscription data in a third network function.

In embodiments of the present disclosure, the third network function may comprise a unified data management, UDM. The third network function may comprise a policy control function, PCF.

In embodiments of the present disclosure, the response may include a validity time for the at least one service parameter.

In embodiments of the present disclosure, the at least one service parameter may comprise: an identity of a service. The at least one service parameter may comprise: an identity of the UE or the group of UEs.

In embodiments of the present disclosure, the at least one service parameter may further comprise: an identity of a service provider. The at least one service parameter may further comprise: service-related data which is part of subscription data for the UE or the group of UEs. The service-related data may comprise slicing information, and/or a data network name, DNN, and/or a single network slice selection assistance information, S-NSSAI.

In embodiments of the present disclosure, the identity of a service may be associated to any one of: a UE route selection policy, URSP, or an AF session with QoS, or an AF influenced traffic routing, or a Service Specific Parameter Provisioning, or a Service Area Restriction, or a Traffic Steering Policy which requires PCF policy evaluation. The service provider may comprise an AF, or a machine type communication, MTC, Provider.

In embodiments of the present disclosure, the request may be authorized when a service indicated by the identity of the service is authorized for the UE or the group of UEs, and/or when the service-related data includes DNN and/or S-NSSAI belonging to a list of subscribed DNNs and/or S-NSSAIs.

In embodiments of the present disclosure, the first network function may comprise an application function, AF. The second network function may comprise a network exposure function, NEF.

A second aspect of the present disclosure provides a method performed by a second network function. The method may comprise receiving from a first network function a first request for providing at least one service parameter for a UE or a group of UEs, transmitting a second request to a third network function to request whether the first network function is authorized to provide the at least one service parameter for the UE or the group of UEs, receiving from the third network function a response to the second request indicating a result of an authorization, and transmitting to the first network function a response about whether the first request is authorized.

In embodiments of the present disclosure, the first request and/or the second request may be authorized, when the at least one service parameter belongs to subscription data in the third network function.

In embodiments of the present disclosure, the third network function may comprise a unified data management, UDM. The third network function may comprise a policy control function, PCF.

In embodiments of the present disclosure, the response to the first request and/or the response to the second request may include a validity time for the at least one service parameter.

In embodiments of the present disclosure, the method may further comprise: storing the at least one service parameter in a fourth network function, when the first request and/or the second request is authorized.

In embodiments of the present disclosure, the fourth network function may comprise a unified data repository, UDR.

In embodiments of the present disclosure, the at least one service parameter may comprise: an identity of a service. The at least one service parameter may comprise: an identity of the UE or of the group of UEs.

In embodiments of the present disclosure, the at least one service parameter may further comprise: an identity of a service provider. The at least one service parameter may further comprise: service-related data which is part of subscription data for the UE or the group of UEs. The service-related data may comprise slicing information, and/or a data network name, DNN, and/or a single network slice selection assistance information, S-NSSAI.

In embodiments of the present disclosure, the identity of a service may be associated to any one of: a UE route selection policy, URSP, or an AF session with QoS, or an AF influenced traffic routing, or a Service Specific Parameter Provisioning, or a Service Area Restriction, or a Traffic Steering Policy which requires PCF policy evaluation. The service provider may comprise an AF, or a machine type communication, MTC, Provider.

In embodiments of the present disclosure, the first request and/or the second request may be authorized when a service indicated by the identity of the service is authorized for the UE or the group of UEs, and/or when the service-related data includes DNN and/or S-NSSAI belonging to a list of subscribed DNNs and/or S-NSSAIs.

In embodiments of the present disclosure, the fourth network function may notify a fifth network function about the at least one service parameter.

In embodiments of the present disclosure, the fifth network function may comprise a policy control function, PCF.

In embodiments of the present disclosure, the first network function may comprise an application function, AF. The second network function may comprise a network exposure function, NEF.

A third aspect of the present disclosure provides a method performed by a third network function. The method may comprise: receiving from a second network function a request for providing whether a first network function is authorized to provide at least one service parameter for a UE or a group of UEs, and transmitting to the second network function, a response to indicate a result of an authorization.

In embodiments of the present disclosure, the request may be authorized, when the at least one service parameter belongs to subscription data in the third network function.

In embodiments of the present disclosure, the third network function may comprise a UDM, or a PCF. The second network function may comprise a NEF.

In embodiments of the present disclosure, the response may include a validity time for the at least one service parameter.

In embodiments of the present disclosure, the at least one service parameter may comprise an identity of a service. The at least one service parameter may comprise an identity of the UE or the group of UEs.

In embodiments of the present disclosure, the at least one service parameter may further comprise: an identity of a service provider. The at least one service parameter may further comprise: service-related data which is part of subscription data for the UE or the group of UEs. The service-related data may comprise slicing information, and/or a data network name, DNN, and/or a single network slice selection assistance information, S-NSSAI.

In embodiments of the present disclosure, the identity of a service may be associated to any one of: a UE route selection policy, URSP, or an AF session with QoS, or an AF influenced traffic routing, or a Service Specific Parameter Provisioning, or a Service Area Restriction, or a Traffic Steering Policy which require PCF policy evaluation. The service provider may comprise an AF, or a machine type communication, MTC, Provider.

In embodiments of the present disclosure, the request may be authorized when a service indicated by the identity of the service is authorized for the UE or the group of UEs, and/or when the service-related data includes DNN and/or S-NSSAI belonging to a list of subscribed DNNs and/or S-NSSAIs.

A fourth aspect of the present disclosure provides a first network function. The first network function may comprise: one or more processors, and one or more memories comprising computer program codes. The one or more memories and the computer program codes may be configured to, with the one or more processors, cause the first network function at least to: transmit, to a second network function, a request for providing at least one service parameter for a UE or a group of UEs; and receive, from the second network function, a response about whether the request is authorized.

In embodiments of the present disclosure, the first network function may be further caused to perform the method according to any of embodiments above described.

A fifth aspect of the present disclosure provides a second network function. The second network function may comprise: one or more processors, and one or more memories comprising computer program codes. The one or more memories and the computer program codes may be configured to, with the one or more processors, cause the second network function at least to: receive, from a first network function, a first request for providing at least one service parameter for a UE or a group of UEs; transmit a second request to a third network function to request whether the first network function is authorized to provide the at least one service parameter for the UE or the group of UEs; receive, from the third network function, a response to the second request indicating a result of an authorization; and transmit, to the first network function, a response about whether the first request is authorized.

In embodiments of the present disclosure, the second network function may be further caused to perform the method according to any of embodiments above described.

A sixth aspect of the present disclosure provides a third network function. The third network function may comprise: one or more processors, and one or more memories comprising computer program codes. The one or more memories and the computer program codes are configured to, with the one or more processors, cause the third network function at least to: receive, from a second network function, a request for providing whether a first network function is authorized to provide at least one service parameter for a UE or a group of UEs; transmit, to the second network function, a response to indicate a result of an authorization.

In embodiments of the present disclosure, the third network function is further caused to perform the method according to any of embodiments above described.

A seventh aspect of the present disclosure provides a computer-readable medium having computer program codes embodied thereon for use with a network function, wherein the computer program codes comprise codes for performing the method according to any one of embodiments above described.

An eighth aspect of the present disclosure provides a first network function. The first network function may comprise a transmitting unit, configured to transmit to a second network function a request for providing by the first network function at least one service parameter for a terminal device. The first network function may further comprise a receiving unit, configured to receive from the second network function, a response about whether the request is authorized.

A ninth aspect of the present disclosure provides a second network function. The second network function may comprise a receiving unit, configured to receive, from a first network function, a request for providing by the first network function at least one service parameter for a terminal device. The second network function may further comprise a transmitting unit, configured to transmit to the first network function, a response about whether the request is authorized.

A tenth aspect of the present disclosure provides a third network function. The third network function may comprise a receiving unit, configured to receive from a second network function, a request for providing by a first network function at least one service parameter for a terminal device. The third network function may further comprise a transmitting unit, configured to transmit, to the second network function, a response about whether the request is authorized.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station.

According to a twelfth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry.

According to a thirteenth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry.

According to a fourteenth aspect of the present disclosure, there is provided a method implemented in a communication system which may include a host computer, a base station and a UE. The method may comprise, at the host computer, receiving user data transmitted to the base station from the UE.

According to a fifteenth aspect of the present disclosure, there is provided a communication system including a host computer. The host computer may comprise a communication interface configured to receive user data originating from a transmission from a UE to a base station. The UE may comprise a radio interface and processing circuitry.

According to a sixteenth aspect of the present disclosure, there is provided a method implemented in a communication system which may include a host computer, a base station and a UE. The method may comprise, at the host computer, receiving, from the base station, user data originating from a transmission which the base station has received from the UE.

According to a seventeenth aspect of the present disclosure, there is provided a communication system which may include a host computer. The host computer may comprise a communication interface configured to receive user data originating from a transmission from a UE to a base station. The base station may comprise a radio interface and processing circuitry.

According to embodiments of the present disclosure, a method or an apparatus is provided for providing configuration for serving terminal device. Particularly, after a first network function transmits a request for providing at least one service parameter for a terminal device, the first network function may obtain a response about whether the request is authorized.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 is a flow chart showing a method performed by a first network function, according to embodiments of the present disclosure.

FIG. 3A is a flow chart showing a method performed by a second network function, according to embodiments of the present disclosure.

FIG. 3B is a flow chart showing an additional step of the method performed by the second network function, according to embodiments of the present disclosure.

FIG. 3C is a flow chart showing another additional step of the method performed by the second network function, according to embodiments of the present disclosure.

FIG. 3D is a flow chart showing another method performed by the second network function, according to embodiments of the present disclosure.

FIG. 4 is a flow chart showing a method performed by a third network function, according to embodiments of the present disclosure.

FIG. 8A is a schematic showing units of the apparatus for a first network function, according to embodiments of the present disclosure.

FIG. 8B is a schematic showing units of the apparatus for a second network function, according to embodiments of the present disclosure.

FIG. 8C is a schematic showing units of the apparatus for a third network function, according to embodiments of the present disclosure.

DETAILED DESCRIPTION

Figure 1A:
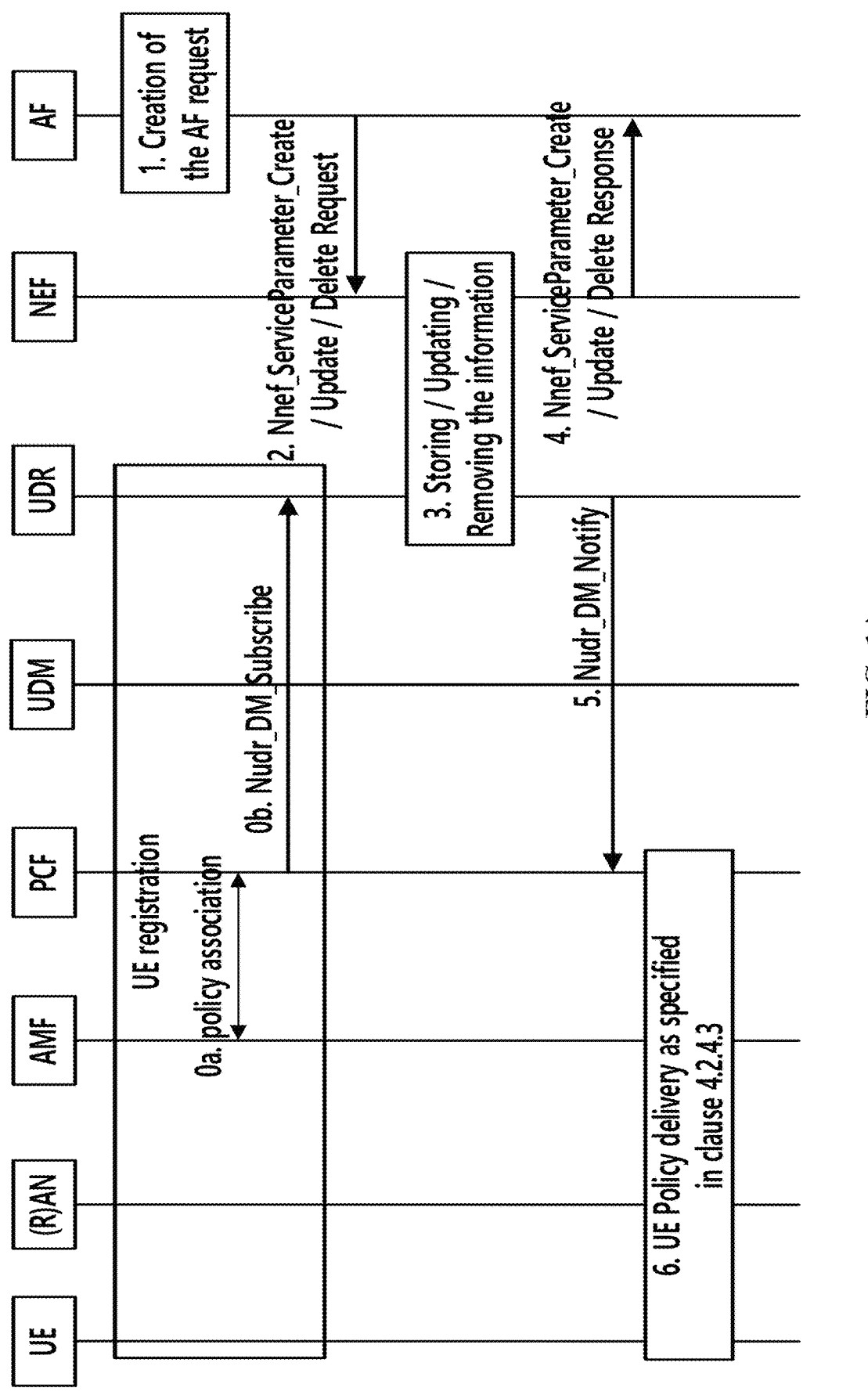
FIG. 1A is a diagram showing an exemplary procedure for service parameter provisioning.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "function" refers to a device/apparatus/node/entity with accessing capability in a communication system via which a terminal device accesses to the network or receives services therefrom. The function may include a base station (BS), an access point (AP), a multi-cell/multi-cast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network function may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like.

More generally, however, the network function may represent any suitable device (or group of devices) capable, configured, arranged, and/or operable to enable and/or provide a terminal device access to a wireless communication network or to provide some service to a terminal device that has accessed to the wireless communication network.

For example, in embodiments of the present disclosure, such function may be embodied in any kind of hardware and/or software of a standalone apparatus, a virtual machine, a cloud-implemented server, and/or a distributed server, etc.

The term "terminal device" encompasses a device which is able to communicate with a network entity/network function, such as a base station, or with another wireless device by transmitting and/or receiving wireless signals. Thus, the term terminal device encompasses, but is not limited to: a mobile phone, a stationary or mobile wireless device for machine-to-machine communication, an integrated or embedded wireless card, an externally plugged in wireless card, a vehicle, etc.

As yet another specific example, in an Internet of things (IOT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IOT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Some solutions provided for a network function to provide service specific parameters.

FIG. 1A is a diagram showing an exemplary procedure for service parameter provisioning.

For example, in 3GPP TS (technical specification) 23.502 Rel-16 V16.6.0 (FIG. 1A corresponds to FIG. 4.15.6.7-1 of the TS), a NEF Service procedure has been defined to enable the AF to provide service specific parameters to 5G system via NEF.

In step 1, the AF may create the AF request. For example, the AF request sent to the NEF may contain the information as below:
1) service description
   a combination of DNN and S-NSSAI
   an AF service identifier
   an application identifier
2) Target UE(s) or group of UEs
   GPSI (Generic Public Subscription Identifier), UE IPv4/IPv6/MAC Address, UE Group ID, any UE ID
3) Service Parameters
   configuration parameters for V2X (vehicle to everything)
This procedure has been defined as generic for any service. In the current release of the specification, it is intended to be used for V2X UCs (V2X Use Cases).

In steps 2, 3, the NEF authorizes the request received from the AF (e.g. it checks whether the AF is authorized to invoke the API (application program interface)/operation) and stores the information in the UDR as "Application Data".

Using steps 5, 6, the Service Parameters are delivered to the targeted UE by the PCF when the UE is reachable following the UE Policy delivery procedure as specified in 3GPP TS 23.502 V16.6.0 clause 4.2.4.3. If the PCF is notified UE Policy delivery failure the PCF may subscribe the "Connectivity state changes (IDLE or CONNECTED)" event as defined in clause 5.2.2.3.

In step 4, the AF may receive response from the NEF indicating the request is successfully received. However, the problem is that the AF is not aware of whether the request itself is authorized for configuring the service for UE, and the AF can only trust in the response for successful reception provided by the NEF when the request was done.

In 3GPP Rel 17, new WID (Work Item Description) has been created for Enhancement of support for Edge Computing in 5GC (5G core network), and based on the recommendation in TR (technical report) 23.748 V2.0.0 for Key Issue #1: DNS based solutions for Multiple PDU Sessions (TR clause 9.1.1), it is proposed to reuse and enhance this procedure to allow the AF to influence decisions on the UE route selection policy, URSPs for a UE.

UE route may relate to network slicing. Network slicing concept is used to fulfill rich requirements from various 5G use cases. Various network services with different characteristics will be exposed to third party applications/users/operators as capabilities to enable various new business models. A specific network service can be instantiated according to on demand requirements for third party users/operators and the business policy between the network service providers and network the service consumers.

It is expected that there would be many different types of dedicated core networks for different usages in future. The relation between specific usage and the network service with special characteristics may be dynamic and flexible to support flexible/agile business model. For example, during initial period of special usage, it is possible that special usage traffic is still served by a common network for basic network service. With the increased numbers of special users or VIP users, a dedicated network service is instantiated to support required features and enable the flexible business model. In addition, as mentioned by 3GPP, usually one default CN is associated with one or more dedicated core networks. In case the dedicated core network for the usage is not available or no sufficient info, the special usage UE can be directed to default CN for basic network service or steered to a Dedicated Network Slice or DCN (dedicated core network) using serving operator specific policies.

The 5GC provides policy information the UE, such as UE Route Selection Policy (URSP). This policy is used by the UE to determine if a detected application traffic can be associated to an established PDU (protocol data unit) Session, can be offloaded to non-3GPP access outside a PDU Session, or can trigger the establishment of a new PDU Session.

Part of URSP is Network slicing selection Policy (NSSP). This is used by the UE to associate the matching application with a specific network slice. As such UE can run the application using the connection setup within the designated network slice which has pre-defined features, quality of service that can fulfill certain business model.

Currently, URSP/NSSP rules may be pre-configured in the UE or may be provided to UE by 5GC by means of PCF. The PCF selects the URSP/NSSP rules applicable for each UE based on subscription information, local configuration, and operator policies that can take as input dynamic conditions as for example, UE location, ToD (time of day), etc.

Additionally, there is an ongoing WID in 3GPP Rel17 which enables the AF to influence in the applicable URSPs for a UE or group of UEs, by providing input information through the NEF and UDR to the PCF, to be used in the decision of the applicable URSPs (3GPP TR 23.748).

The establishment of User Plane connectivity to a Data Network via a network slice comprises two steps:

performing a 5GC registration procedure to select an AMF that supports the required Network Slices.

establishing one or more PDU Session to the required Data network within the Network Slice selected.

When a UE registers with a PLMN (Public Land Mobile Network), it provides to the network a Requested NSSAI containing the S-NSSAI(s) corresponding to the slice(s) to which the UE wishes to register. UE associate Applications to S-NSSAIs based on NSSP of the URSP rules.

Figure 1B:
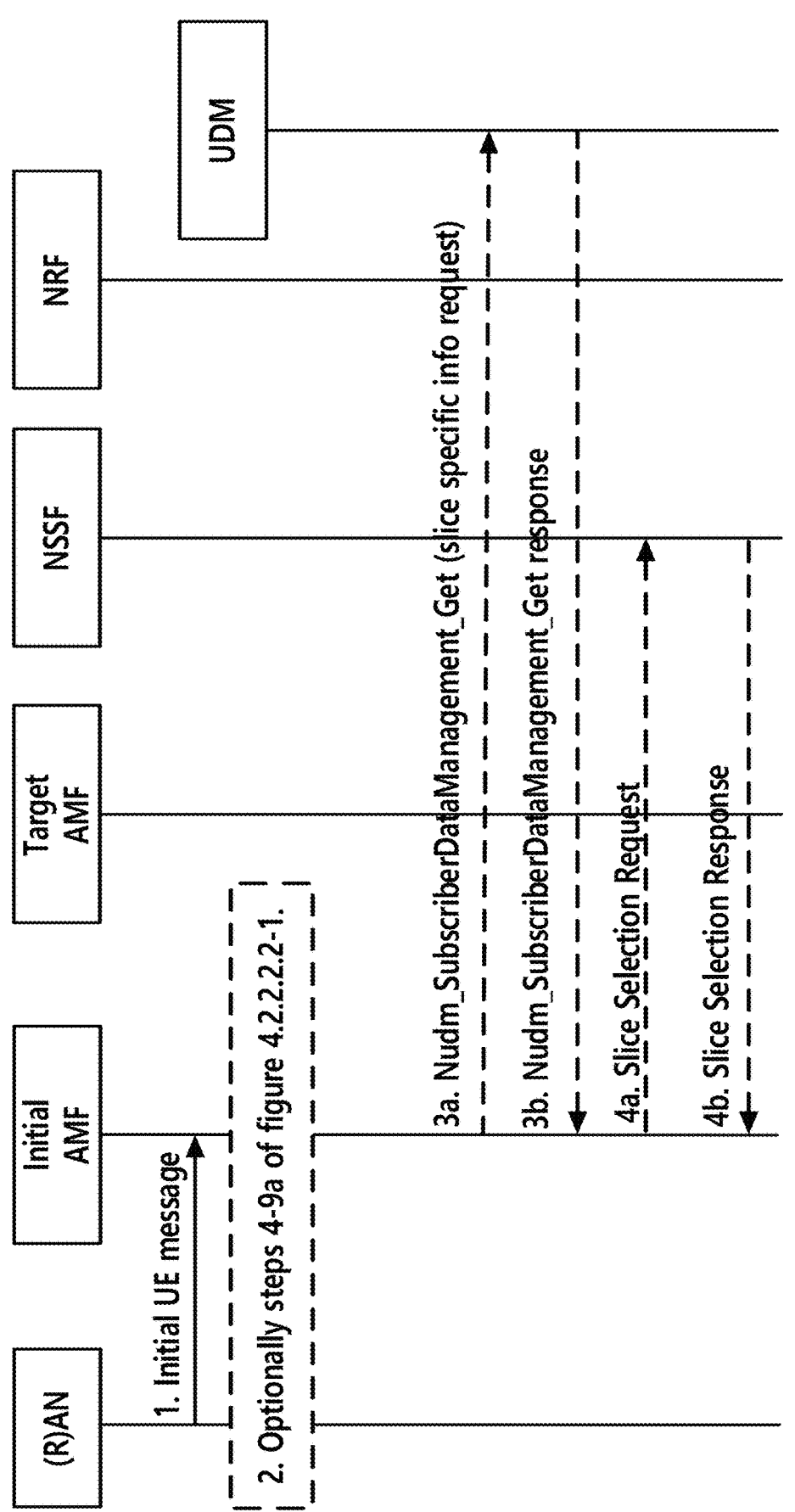
FIG. 1B is a diagram showing an exemplary slice selection flow.

FIG. 1B is a diagram showing an exemplary slice selection flow.

A 3GPP defined network slice selection flow, quote from TS 23.502 (FIG. 1B corresponds to FIG. 4.2.2.2.3-1 of the TS) is shown in FIG. 1B.

The selection of the set of Network Slices for the UE is triggered by the first contacted AMF in a registration procedure normally by interacting with the NSSF.

In step 4a [Conditional], from Initial AMF to NSSF, Slice Selection request (Requested NSSAI (Network Slice Selection Assistance Information), Subscribed S-NSSAIs, TAI (tracking area identity), PLMN ID of the SUPI (subscription permanent identifier)) is transmitted.

If there is a need for slice selection, e.g. the initial AMF cannot serve all the S-NSSAI(s) from the Requested NSSAI permitted by the subscription information, the initial AMF sends a Slice Selection Request to the NSSF. It sends to NSSF Requested NSSAI, Subscribed S-NSSAIs, PLMN ID of the SUPI and the TAI of the UE.

In step 4b, [Conditional], from NSSF to Initial AMF, the Slice Selection response (AMF Set or list of AMF addresses, Allowed NSSAI, [NSI ID], [NRF] (network repository function), [List of rejected (S-NSSAI(s), cause value(s))]) is transmitted.

The NSSF returns to initial AMF the Allowed NSSAI and the target AMF Set or, based on configuration, the list of candidate AMF(s).

As per 3GPP definition, NSSF makes the slice selection decision, based on this information, local configuration, and other available information including RAN capabilities in the current Tracking Area for the UE or analytics information provided by NWDAF (Network Data Analytics Function).

The set of Network Slices for a UE can be changed at any time while the UE is registered with a network, and may be initiated by the network, or by the UE.

From UE side, when URSP rules are updated or their validity change, the association of existing applications to PDU Sessions may need to be re-evaluated. The UE may also re-evaluate the application to PDU Session association due to the following reasons:

periodic re-evaluation based on UE implementation;

an existing PDU Session that is used for routing traffic of an application based on a URSP rule is released.

If the re-evaluation leads to a change of the application to PDU Session association, e.g. the application is to be associated with another PDU session or a new PDU session needs to be established, the UE may enforce such changes in a timely manner based on implementation.

5GC is designed to accommodate various services e.g. massive IoT, critical communications, and enhanced mobile broadband, respectively. To allow the 3rd party/UE to access information regarding services provided by the network (e.g. connectivity information, QoS, mobility, etc.) and to dynamically customize the network capability for different diverse use cases within the limits set by the operator, 5GC provides network exposure capability to enable suitable access/exchange of network information to the 3rd party or UE.

Figure 1C:
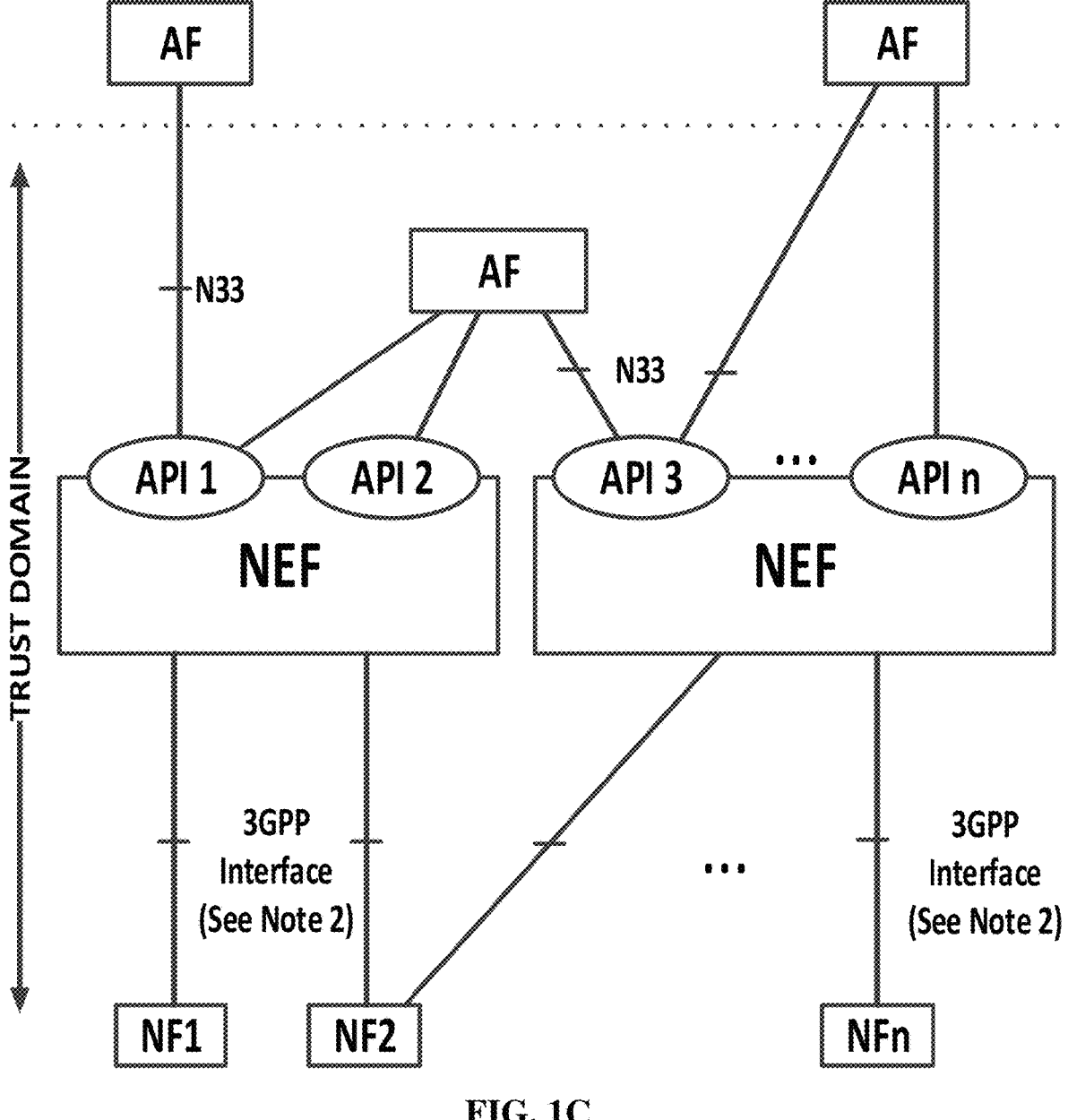
FIG. 1C is a diagram showing exemplary Network Exposure Functions in 5GC.

FIG. 1C is a diagram showing exemplary Network Exposure Functions in 5GC.

The Network Exposure Function (NEF) supports such exposure of capabilities of network functions, making used of the information collecting via 3GPP network internal interfaces, and exposing towards Application Function (AF) via proper APIs. 5GC defined exposure architecture, as per TS 23.501 V16.6.0 (FIG. 1C corresponds to FIG. 4.2.3-5 of the TS), is shown below.

However, the existing 3GPP procedures defined for NEF/ UDM Service APIs lack of a proper and optimal early validation/check of AF Requested specific service information against the allowed values provisioned for the UE in the subscription information in UDR (e.g. requested DNN/S-NSSAI for URSP rules may not belong to the list of allowed S-NSSAI/DNNs combinations for the UE).

It is true that the network (e.g. the PCF) will make these kind of validations later on in the service specific parameter provisioning procedure, to avoid sending incorrect information in URSPs to the UE, but this kind of validation will may happen much time later than when the AF made the request (e.g. if the UE has not been registered yet or depending on the UE location). This results in the AF getting a successful response for the AF request of service specific parameter provisioning, but not being really a valid request, so after sometime (e.g. many hours later) when the UE contacts the network or access to certain location the PCF may do this validation and skip this request since it is not valid. The problem is that the AF is not aware of this error and still trust in the successful response provided by the NEF when the request was done.

FIG. 2 is a flow chart showing a method performed by a first network function, according to embodiments of the present disclosure.

As shown in FIG. 2, the method performed by a first network function 200 may comprise: S201, transmitting to a second network function a request for providing by the first network function at least one service parameter for a terminal device, and S202, receiving from the second network function a response about whether the request is authorized.

In embodiments of the present disclosure, the at least one service parameter may be for the terminal device or a group of terminal devices including the terminal device.

Further, the terminal device may comprise a UE, as a particular example. That is, in step S201, the at least one service parameter may be provided for a UE or a group UE.

According to embodiments of the present disclosure, the first network function may obtain a response about whether the request is authorized. An early authorization and validation for configuration from the first network function may be performed. Therefore, the first network function may be more aware of the situation of the service for the terminal device. The efficiency for providing service and/or for configuring the service by the first network function may be improved.

In embodiments of the present disclosure, the terminal device may comprise a user equipment (UE) which is indicated by SUPI, GPSI, etc., or any other kind of devices which can communicate with the radio station.

In embodiments of the present disclosure, the request may be authorized, when the at least one service parameter belongs to subscription data in a third network function.

In embodiments of the present disclosure, the third network function may comprise a UDM, or a PCF.

According to embodiments, if the at least one service parameter belongs to subscription data in a third network function, such as UDM, the request may be authorized. Particularly, since the UDM is currently preforming authorization for many other exposure features, it will be efficient to improve the current UDM to further have capability for authorizing the request from the first network function.

In embodiments of the present disclosure, the response may include a validity time for the at least one service parameter.

According to embodiments of the present disclosure, by using the validity time for the at least one service parameter, the first network function may be aware when the configuration needs to be requested/updated again.

In embodiments of the present disclosure, the at least one service parameter may comprise: an identity of a service. The at least one service parameter may comprise: an identity of the terminal device.

According to embodiments of the present disclosure, several parameters, such as an identity indicating a service, and/or an identity indicating the terminal device, may be preferrable, or even mandatory. For example, by using these parameters, the request may at least indicate that a specific service for a specific terminal device is to be configured by the first network function.

In embodiments of the present disclosure, the at least one service parameter may further comprise: an identity of a service provider. The at least one service parameter may further comprise: service-related data which is part of subscription data for the terminal device. The service-related data may comprise slicing information, and/or a data network name, DNN, and/or a single network slice selection assistance information, S-NSSAI.

In embodiments of the present disclosure, the identity of a service may be associated to any existing service or nay new service. For example, in embodiments of the present disclosure, the identity of a service may be associated to any one of: a UE route selection policy, URSP, or an AF session with QoS, or an AF influenced traffic routing, or a Service Specific Parameter Provisioning (such as for v2x), or a Service Area Restriction, or a Traffic Steering Policy which requires PCF policy evaluation. The service provider may comprise an AF, or a machine type communication, MTC, Provider.

In embodiments, the Service Provider would mean a MTC Service Provider or any other content service provider (e.g. Netflix, YouTube), and it can be identified by AFId or SCSAsId (Service Capability Server/Application Server Id) or mtcProviderId from NEF north bound API point of view.

In embodiments of the present disclosure, the request may be authorized when a service indicated by the identity of the service is authorized for the terminal device, and/or when the service-related data includes DNN and/or S-NSSAI belonging to a list of subscribed DNNs and/or S-NSSAIs.

According to embodiments of the present disclosure, the identity of the service may indicate any kind of possible service provided by the first network function for the terminal device. Further, based on different service, different additional parameters may be also included in the request.

In embodiments of the present disclosure, the first network function may comprise an application function, AF. The second network function may comprise a network exposure function, NEF.

FIG. 3A is a flow chart showing a method performed by a second network function, according to embodiments of the present disclosure.

The method performed by a second network function 300 may comprise: S301, receiving from a first network function a request for providing by the first network function at least one service parameter for a terminal device, and S302, transmitting to the first network function a response about whether the request is authorized.

FIG. 3B is a flow chart showing an additional step of the method performed by the second network function, according to embodiments of the present disclosure.

In embodiments of the present disclosure, the method may further comprise: S303, determining whether the first network function is authorized for a service for the terminal device, based on a local policy, S304, transmitting the request to a third network function, when the first network function is authorized, and S305, receiving, from the third network function, the response about whether the request is authorized.

It should be understood that, when transmitting the request to a third network function, the second network function needs not to transmit the exactly same request. For example, some parameters may be deleted, or added. Further, some parameters may be mapped from external format/value to internal format/value.

In embodiments of the present disclosure, the request (such as the first request and/or the second request) may be authorized, when the at least one service parameter belongs to subscription data in the third network function.

In embodiments of the present disclosure, the third network function may comprise a unified data management, UDM, or a PCF.

In embodiments of the present disclosure, the response (such as the response to the first request and/or the response to the second request) may include a validity time for the at least one service parameter.

In embodiments of the present disclosure, the at least one service parameter may be for the terminal device or a group of terminal devices including the terminal device.

FIG. 3C is a flow chart showing another additional step of the method performed by the second network function, according to embodiments of the present disclosure.

In embodiments of the present disclosure, the method may further comprise: S306, storing the at least one service parameter in a fourth network function, when the request is authorized. The at least one service parameter may be stored when the first request and/or the second request is authorized.

In embodiments of the present disclosure, the fourth network function may comprise a unified data repository, UDR.

According to embodiments of the present disclosure, if the request is authorized, then the at least one service parameter may be stored for configuring the service for the terminal device.

FIG. 3D is a flow chart showing another method performed by the second network function, according to embodiments of the present disclosure.

As show in FIG. 3D, the method performed by a second network function, may comprise: step S307, receiving, from a first network function, a first request for providing at least one service parameter for a UE or a group of UEs; step S308, transmitting a second request to a third network function to request whether the first network function is authorized to provide the at least one service parameter for the UE or the group of UEs; step S309, receiving, from the third network function, a response to the second request indicating a result of an authorization; and step S310, transmitting, to the first network function, a response about whether the first request is authorized.

In embodiments of the present disclosure, the at least one service parameter may comprise: an identity of a service. The at least one service parameter may comprise: an identity of the terminal device. The identity may be of the UE of the group of UEs.

In embodiments of the present disclosure, the at least one service parameter may further comprise: an identity of a service provider. The at least one service parameter may further comprise: service-related data which is part of subscription data for the terminal device. The service-related data may comprise slicing information, and/or a data network name, DNN, and/or a single network slice selection assistance information, S-NSSAI.

In embodiments of the present disclosure, the identity of a service may be associated to any one of: a UE route selection policy, URSP, or an AF session with QoS, or an AF influenced traffic routing, or a Service Specific Parameter Provisioning, or a Service Area Restriction, or a Traffic Steering Policy which requires PCF policy evaluation. The service provider may comprise an AF, or a machine type communication, MTC, Provider.

In embodiments of the present disclosure, the request (such as the first request and/or the second request) may be authorized when a service indicated by the identity of the service is authorized for the terminal device, and/or when the service-related data includes DNN and/or S-NSSAI belonging to a list of subscribed DNNs and/or S-NSSAIs.

In embodiments of the present disclosure, the fourth network function may notify a fifth network function about the at least one service parameter.

In embodiments of the present disclosure, the fifth network function may comprise a policy control function, PCF.

According to embodiments of the present disclosure, after the PCF receives the at least one service parameter (or part of the at least one service parameter including policy for serving the terminal device), the policy may be delivered to UE as specified in 3GPP TS.

In embodiments of the present disclosure, the first network function may comprise an application function, AF. The second network function may comprise a network exposure function, NEF.

Figure 4:
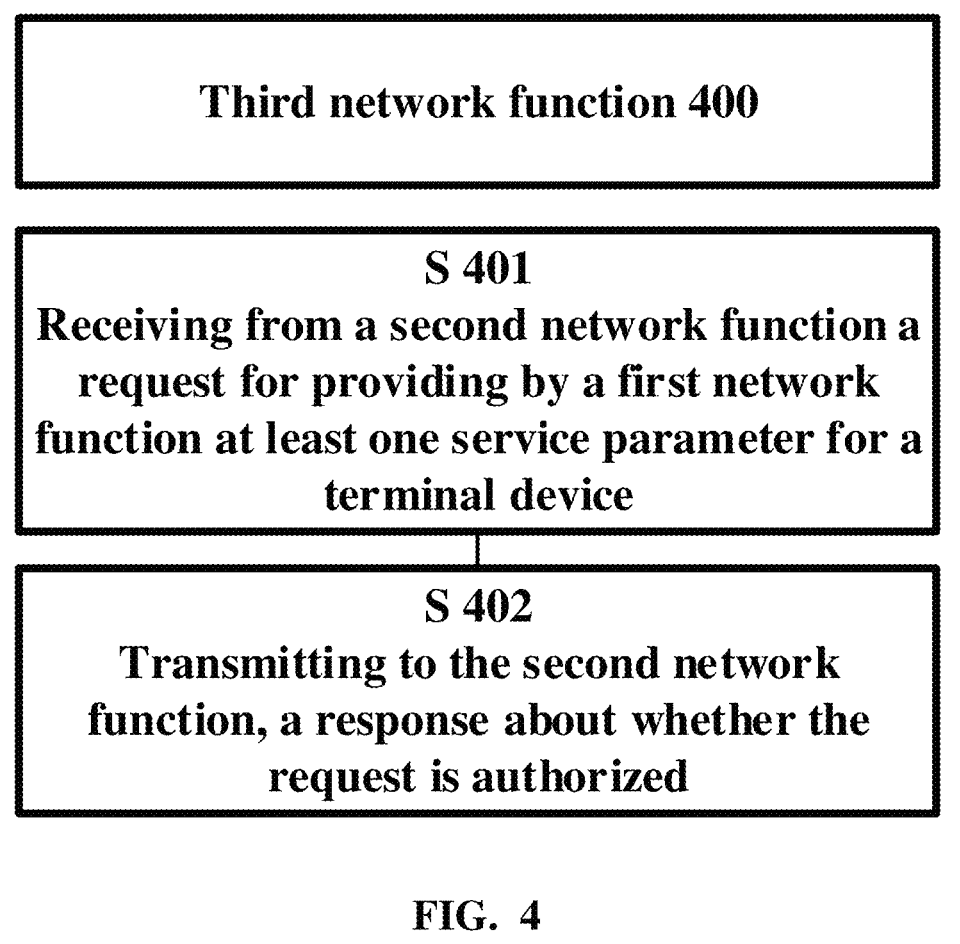

FIG. 4 is a flow chart showing a method performed by a third network function, according to embodiments of the present disclosure.

The method performed by a third network function 400 may comprise: S401, receiving from a second network function a request for providing by a first network function at least one service parameter for a terminal device, and S402, transmitting to the second network function, a response about whether the request is authorized.

In S401, the request may be for providing whether a first network function is authorized to provide at least one service parameter for a UE or a group of UEs. In S402, the response may indicate a result of an authorization.

In embodiments of the present disclosure, the request may be authorized, when the at least one service parameter belongs to subscription data in the third network function.

In embodiments of the present disclosure, the third network function may comprise a UDM, or a PCF. The second network function may comprise a NEF.

In embodiments of the present disclosure, the response may include a validity time for the at least one service parameter.

In embodiments of the present disclosure, the at least one service parameter may be for the terminal device or a group of terminal devices including the terminal device.

In embodiments of the present disclosure, the at least one service parameter may comprise: an identity of a service; and/or an identity of the terminal device. The identity of the terminal device may be for the UE of the group of UEs.

In embodiments of the present disclosure, the at least one service parameter may further comprise: an identity of a service provider. The at least one service parameter may further comprise: service-related data which is part of subscription data for the terminal device. The subscription data for the terminal device may be for the UE of the group of UEs. The service-related data may comprise slicing information, and/or a data network name, DNN, and/or a single network slice selection assistance information, S-NSSAI.

In embodiments of the present disclosure, the identity of a service may be associated to any one of: a UE route selection policy, URSP, or an AF session with QoS, or an AF influenced traffic routing, or a Service Specific Parameter Provisioning, or a Service Area Restriction, or a Traffic Steering Policy which requires PCF policy evaluation. The service provider may comprise an AF, or a machine type communication, MTC, Provider.

In embodiments of the present disclosure, the request may be authorized when a service indicated by the identity of the service is authorized for the terminal device, and/or when the service-related data includes DNN and/or S-NSSAI belonging to a list of subscribed DNNs and/or S-NSSAIs. The service indicated by the identity of the service is authorized for the UE of the group of UEs.

Figure 5A:
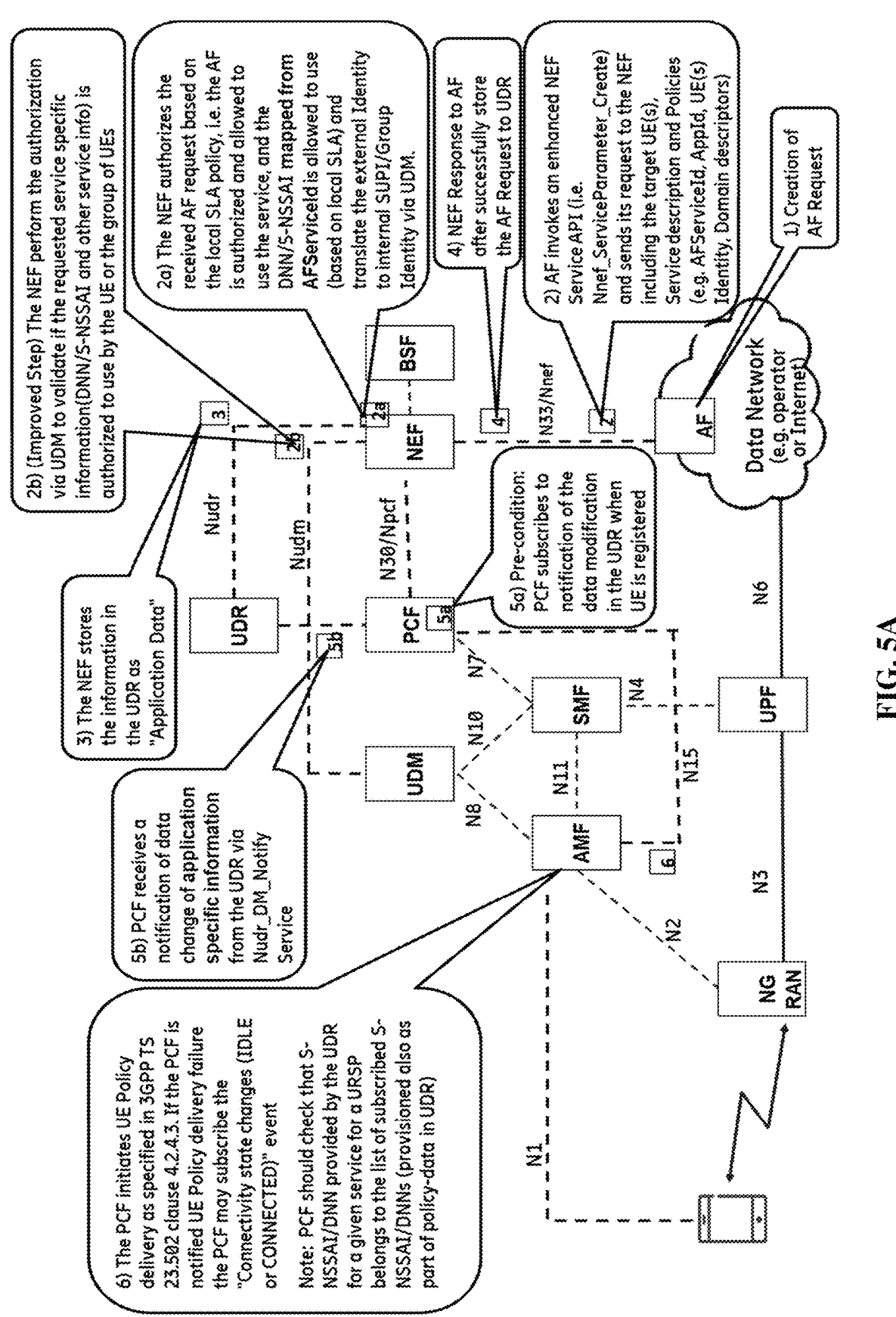
FIG. 5A is a diagram showing an overview of the high-level solution of some embodiments of the present disclosure.

FIG. 5A is a diagram showing an overview of the high-level solution of some embodiments of the present disclosure.

As shown in FIG. 5A, in step 1, the AF Request may be created by the AF, such as in a data network (e.g. operator or internet).

In step 2, AF invokes an enhanced NEF Service API (i.e. Nnef_ServiceParameter_Create) and sends its request to the NEF including the target UE(s), Service description and Policies (e.g. AFServiceId, AppId, UE(s) Identity, Domain descriptors).

In step 2a, the NEF authorizes the received AF request based on the local SLA (service level agreement) policy, i.e. the AF is authorized and allowed to use the service, and the DNN/S-NSSAI mapped from AFServiceId is allowed to use (based on local SLA) and translate the external Identity to internal SUPI/Group Identity via UDM.

Preferably, there may be several mandatory parameters (e.g. identity of the service-URSP or AF session with QoS, identity of the terminal device). The rest can be optional, but UDM may authorize the request based on this two minimum parameters (service id and device id). Other parameters may be also added (e.g. MTC provider Id). Then, based on the service, e.g. URSP, additional parameters are also required, e.g. NSSAI/DNN. Further preferably, all these parameters may need to be authorized for the device, that is: 1) service (e.g. URSP) 2) MTC provider (a service provider which produces multiple applications) (e.g. google.com) 3) service-related parameters (e.g. for URSP, these are the NSSAI/DNN, since they are a must when URSP is requested).

The local policy may be per subscriber/device, i.e. it is not generic for all devices. It is a provisioned policy per device (e.g. for device-1, URSP requested by MTC provider-1 is allowed, as long as the NSSAI/DNN requested in URSP are also provisioned for device-1).

In step 2b, (improved step) the NEF perform the authorization via UDM to validate if the requested service specific information (DNN/S-NSSAI and other service info) is authorized to use by the UE or the group of UEs.

In step 3, the NEF stores the information in the UDR as "Application Data".

In step 4, NEF respond to AF after successfully store the AF Request to UDR.

In step 5a, (pre-condition): PCF subscribes to notification of the data modification in the UDR when UE is registered.

In step 5b, PCF receives a notification of data change of application specific information from the UDR via Nudr_DM_Notify Service.

In step 6, the PCF initiates UE Policy delivery as specified in 3GPP TS 23.502 clause 4.2.4.3. If the PCF is notified UE Policy delivery failure the PCF may subscribe the "Connectivity state changes (IDLE or CONNECTED)" event.

PCF should check that S-NSSAI/DNN provided by the UDR for a given service for a URSP belongs to the list of subscribed S-NSSAI/DNNs (provisioned also as part of policy-data in UDR).

Figure 5B:
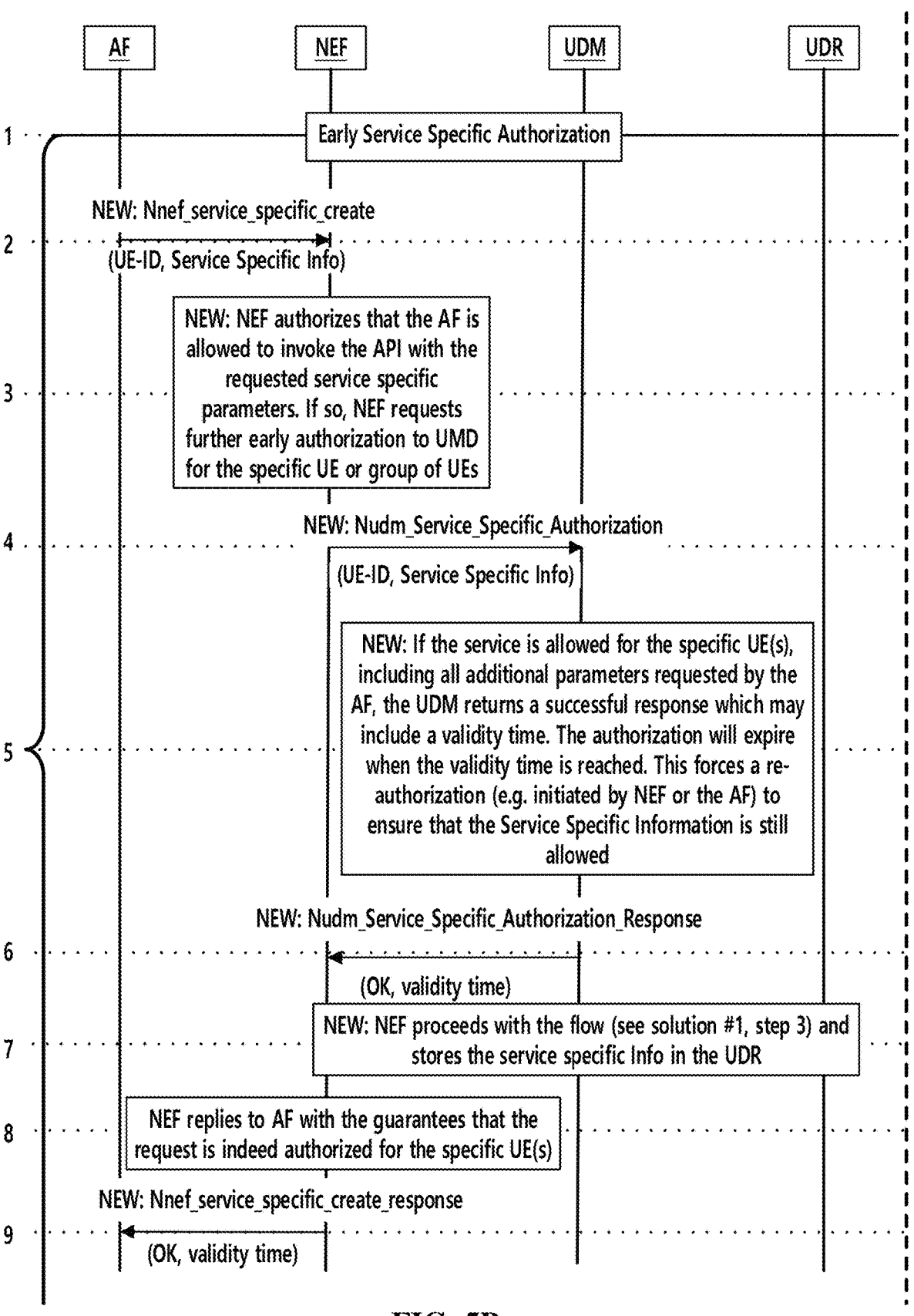
FIG. 5B is a call flow diagram showing an exemplary UDM-based early authorization procedure.

FIG. 5B is an exemplary call flow showing a UDM-based early authorization procedure.

FIG. 5B shows an exemplary solution to allow NEF to perform the early authorization (step 2b in the FIG. 5A) to reject the request immediately when the service specific information is not authorized for the UE or the group of UEs.

This solution can be used as a generic mechanism for early validation/authorization for other Service Specific info requests by AF, e.g. Service Specific Parameter Provisioning, URSP, SAR (Service Area Restriction) and Traffic Steering Policy which require PCF policy evaluation.

As shown in FIG. 5B, the AF may transmit "Nnef_service_specific_create" (including UE-ID, Service Specific Info) to the NEF to trigger such procedure for early service specific authorization.

NEF authorizes that the AF is allowed to invoke the API with requested service specific parameters. If so, NEF requests further early authorization to UDM for the specific UE or group of UEs, by sending "Nudm_Service_Specific_Aothorization" (including UE-ID, Service Specific Info).

If the service is allowed for the specific UE(s), including all additional parameters requested by the AF, the UDM returns a successful response which may include a validity time. The authorization will expire when the validity time is reached. This forces a re-authorization (e.g. initiated by NEF or the AF) to ensure that the Service Specific Information is still allowed.

The NEF may receive "Nudm_Service_Specific_Aothorization_Response" from the UDM. A positive response may include an indication "OK", and a validity time.

Then, NEF may proceed with the flow (see solution #1, step 3, as in FIG. 5B), and stores the service specific info in the UDR.

NEF may reply to AF with the guarantees that the request is indeed authorized for the specific UE(s), by transmitting "Nnef_service_specific_create_response".

It should be understood that the above terms/names for new messages are just examples without limitation.

As an alternative solution, NEF can contact PCF so that instead of UDM it's PCF the one performing the early authorization (subscribed DNN/S-NSSAI is also part of policy data). However, the UDM may be preferable since it is currently preforming authorization for other exposure features (e.g. event exposure, NIDD (Non-IP Data Delivery); parameter provisioning) on a per UE basis, so it is more consistent to have this authorization centralized in a single NF instead of spread across different NFs depending on the AF request. Moreover, PCF is contacted later when notified by UDR, so having the same NF being involved twice (early stage and later stage) for the same procedure might lead to think about the solution of NEF storing the service specific info in UDR directly instead of going through PCF so that PCF ensures that the info stored in UDR is properly authorized.

Another embodiment, less preferable but still applicable, is to reuse by NEF the existing UDM SDM (Subscriber Data Management) service to retrieve DNN/NSSAI, but there are tons of AM data which are not of interest for NEF in the same resource (e.g. RAT (radio access technology) restrictions, UPU (UE parameter update) info, SOR (Steering of Roaming) info, timers) so an adaptation should be required in SDM anyway. Additionally, and more important, it does not solve the service authorization per UE (prior to the consistent DNN/NSSAI check), i.e. a given UE might have the proper DNN/NSSAI, but it could not be allowed for AFs to use this service (in this case, it is the URSP rules, but the existing NIDD could have fallen into this generic mechanism, since also the DNN by NEF/AF is to be consistent with the subscription data) or the UE could be allowed for the service invoked by AFs (e.g. URSP change) but not for the requesting AF/MTC provider. Nudm_SDM service is neither intended nor capable to do this.

Embodiments of the present disclosure provide a generic mechanism for early validation/authorization to be reused for current and/or future Service Specific info requests by AF, e.g. URSP, SAR (Service Area Restriction) which require PCF policy evaluation. Prior to contacting PCF/UDR, NEF may request authorization on a per subscribers' basis on different level (service, DNN/NSSAI) so that the AF is responded with a proper answer (either OK or "request forbidden"), saving resources/signaling in 5GC network and providing reliable answers to AF in an immediate manner.

UDM can additionally check that the management of the requested UE group (or any UE) is authorized for the requesting AF/MTC provider, and perhaps that the DNN/NSSAI (in this particular case, but it depends on the service) is also applicable for the group.

It may be the operator's task to ensure that the provisioned information for both a Group of UEs and the individual UE members is consistent, e.g. that all UEs within the group have the DNN/NSSAI applicable/authorized for the group.

Figure 6:
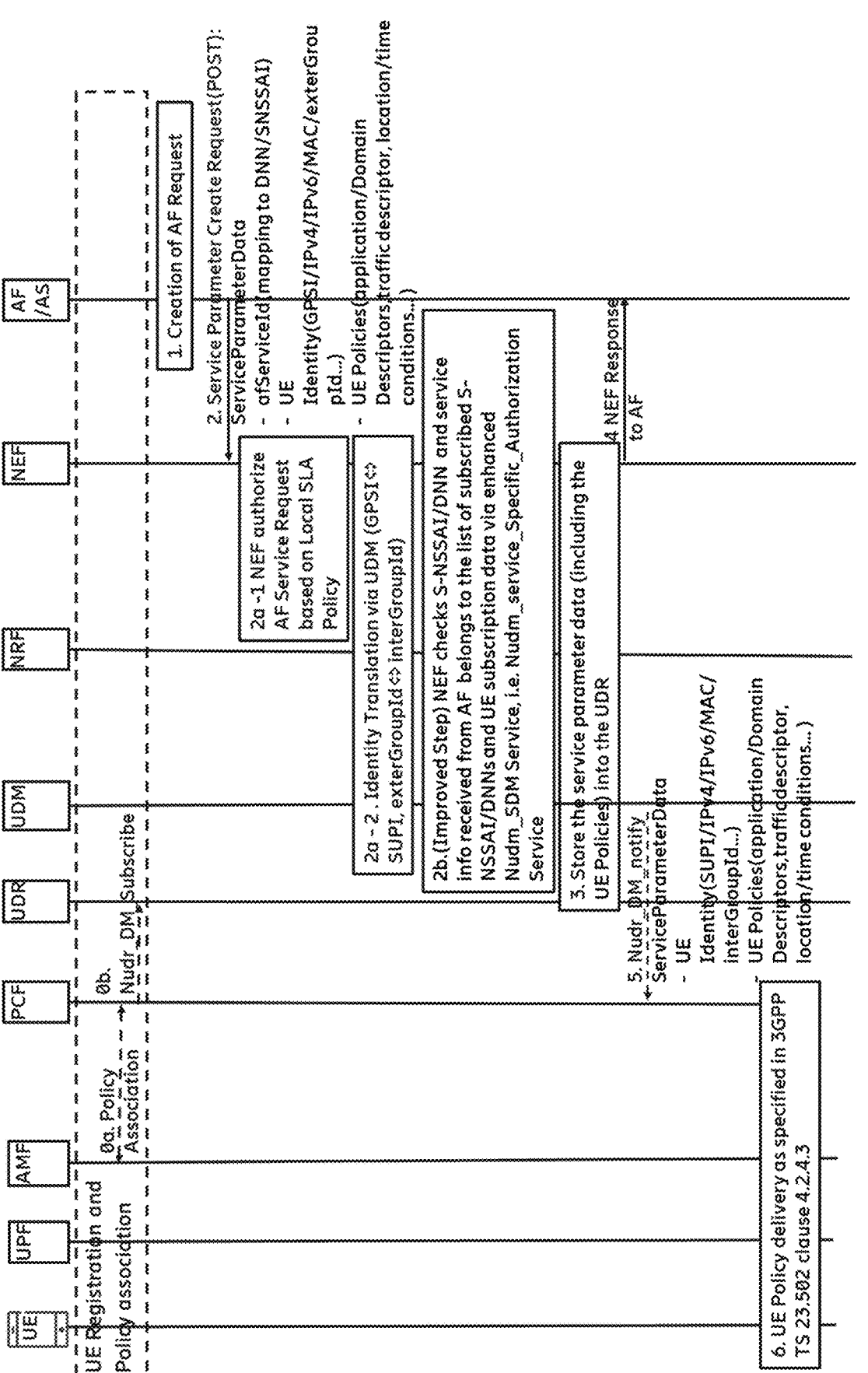
FIG. 6 is an exemplary call flow diagram for providing configuration for serving terminal device, according to embodiments of the present disclosure.

FIG. 6 is an exemplary call flow diagram for providing configuration for serving terminal device, according to embodiments of the present disclosure.

The step 2b may be the enhanced step of procedure from existing 3GPP R16 Service Parameter Provisioning Procedure. Further, the procedure may be enhanced with new parameters in existing steps.

Step 1 shows creation of the AF Request by the AF/AS (application function/application server)

Figure 7A:
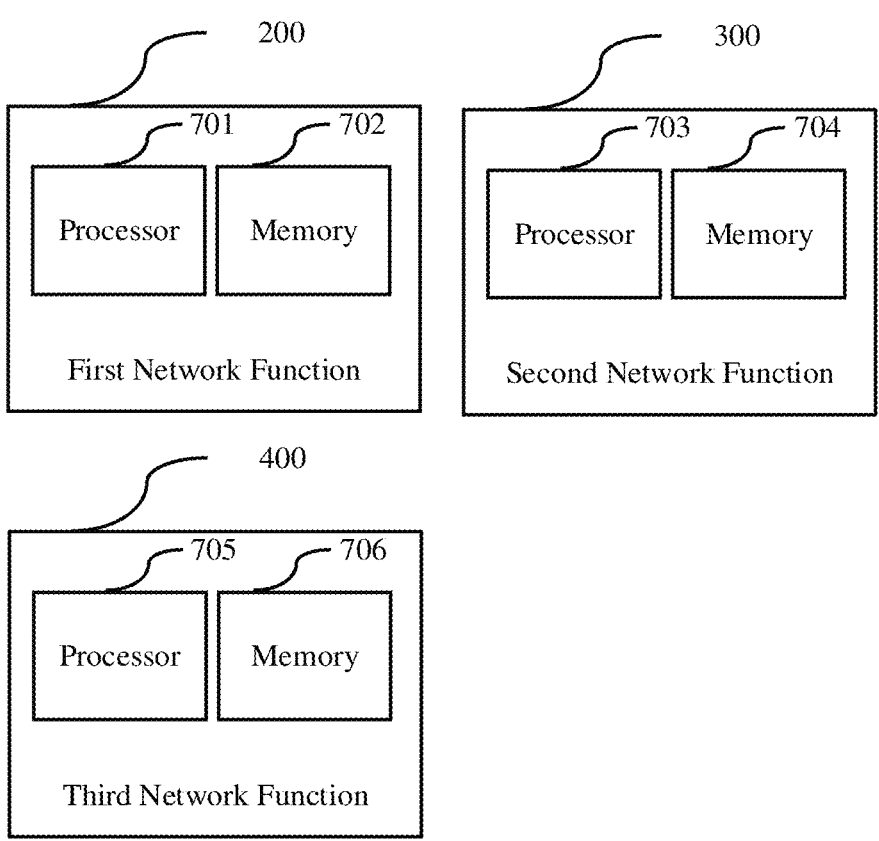
FIG. 7A is a block diagram showing apparatuses for a first network function, a second network function, and a third network function, according to embodiments of the present disclosure.
Figure 7B:
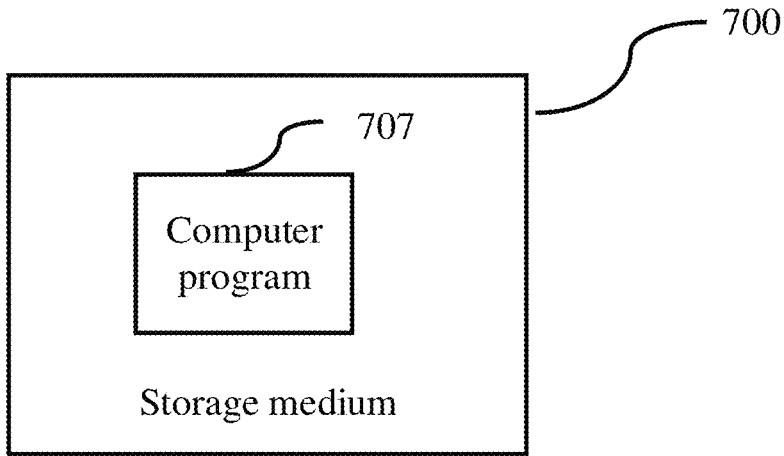
FIG. 7B is a block diagram showing a computer readable storage medium, according to embodiments of the present disclosure.

Step 2 shows that, to create a new request, the AF invokes an enhanced NEF Service API (i.e. Nnef_Service Parameter_Create) service operation and sends its request to the NEF, which may contains the information as below:
1) service description
a combination of DNN and S-NSSAI
an AF service identifier
an application identifier
2) Target UE(s) or group of UEs
GPSI, UE IPv4/IPv6/MAC Address, UE Group ID, any UE ID 3) Service Parameters
   UE Route Policies (Traffic descriptors, application/Domain Descriptors, location/time conditions . . . ).
   Step 2a-1 and 2a-2 shows that the NEF authorizes the AF based on the local SLA (service level agreement) Policies (Partner Management), NEF will translate the external UE ID or Group ID to internal Identity via UDM Service.
   Step 2b (enhanced Step) shows that, NEF shall use an enhanced UDM Service to validate S-NSSAI/DNN and other service info received from AF belongs to the list of subscribed/allowed S-NSSAI/DNNs and services within the UDM subscription data (see FIG. 5). If authorization fails (e.g. DNN is not subscribed for the UE, UE does not allow to modify URSP rules dynamically by an AF or by such specific AF), UDM returns a negative response which is mapped to HTTP 403 response (forbidden) towards the AF: This way, the AF is informed that the request should not be attempted until the conditions change (e.g. when the UE allows such AF to influence URSP rules);
   Step 3 shows that, the NEF stores the AF request information in the UDR as part of the application data together with the assigned Transaction Reference ID.
   Step 4 shows that, NEF response to AF after storing the AF Request Data in UDR.
   Step 5 shows that, the PCF(s) receive(s) a Nudr_DM_Notify notification of data change from the UDR, If the UE is registered to the network and the PCF performs the subscription to notification to the data modified in the UDR by invoking Nudr_DM_Subscribe (AF service parameter provisioning information, SUPI).
   Step 6 shows that, the PCF initiates UE Policy delivery as specified in 3GPP TS 23.502 V16.6.0 clause 4.2.4.3. If the PCF is notified UE Policy delivery failure the PCF may subscribe the "Connectivity state changes (IDLE or CONNECTED)" event as defined in clause 5.2.2.3.
   In such specific implementation, the advantages of embodiments of the present disclosure includes introducing a method to enhance an early authorization and validation of AF Influence URSP change (and other service specific AF requests) and expose such capability to 3rd party applications. It enables enterprise service provider to control the slice tenant usage for their end users and then further improve the slice usage efficiency. An optimized procedure for AF influenced PCF decision for URSP may be provided.
   FIG. 7A is a block diagram showing apparatuses for a first network function, a second network function, and a third network function, according to embodiments of the present disclosure.
   As shown in FIG. 7A, the first/second/third network function 200/300/400 may comprise: one or more processors 701/703/705; and one or more memories 702/704/706 comprising computer program codes. The one or more memories and the computer program codes may be configured to, with the one or more processors, cause the first/second/third network function 200/300/400 at least to: perform the method according to any one of embodiments described above, such as shown in FIGS. 2 to 4.
   For example, the first network function 200 is caused at least to: transmit, to a second network function, a request for providing by the first network function at least one service parameter for a terminal device, and receive, from the second network function, a response about whether the request is authorized.
   For another example, the first network function 200 may be caused at least to: transmit, to a second network function, a request for providing at least one service parameter for a UE or a group of UEs; and receive, from the second network function, a response about whether the request is authorized.
   For example, the second network function is caused at least to: receive, from a first network function, a request for providing by the first network function at least one service parameter for a terminal device, and transmit, to the first network function, a response about whether the request is authorized.
   For another example, the second network function may be caused at least to: receive, from a first network function, a first request for providing at least one service parameter for a UE or a group of UEs; transmit a second request to a third network function to request whether the first network function is authorized to provide the at least one service parameter for the UE or the group of UEs; receive, from the third network function, a response to the second request indicating a result of an authorization; and transmit, to the first network function, a response about whether the first request is authorized.
   For example, the third network function is caused at least to: receive, from a second network function, a request for providing by a first network function at least one service parameter for a terminal device; and transmit, to the second network function, a response about whether the request is authorized.
   For another example, the third network function may be caused at least to: receive, from a second network function, a request for providing whether a first network function is authorized to provide at least one service parameter for a UE or a group of UEs; transmit, to the second network function, a response to indicate a result of an authorization.
   The processors 701, 703, 705 may be any kind of processing component, such as one or more microprocessor or microcontrollers, as well as other digital hardware, which may include digital signal processors (DSPs), special-purpose digital logic, and the like. The memories 702, 704, 706 may be any kind of storage component, such as read-only memory (ROM), random-access memory, cache memory, flash memory devices, optical storage devices, etc.
   FIG. 7B is a block diagram showing a computer readable storage medium, according to embodiments of the present disclosure.
   As shown in FIG. 7B, a computer-readable medium 700 may have computer program codes 707 embodied thereon for use with a first network function/second network function/short message service function. The computer program codes 707 may comprise codes for performing any of the methods above described, such as shown in FIG. 2-4.
   For example, the computer program codes 707 may comprise codes for a first network function 200, a second network function 300, or a third network function 400.
   The computer readable storage medium 700 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.
   FIG. 8A is a schematic showing units of the apparatus for a first network function, according to embodiments of the present disclosure.
   As shown in FIG. 8A, for example, the apparatus for a first network function 200 may comprise: a transmitting unit 8001, configured to transmit to a second network function a request for providing by the first network function at least one service parameter for a terminal device; and a receiving unit 8002, configured to receive from the second network function, a response about whether the request is authorized.

For another example, the transmitting unit 8001 may be configured to transmit to a second network function, a request for providing at least one service parameter for a user equipment, UE, or a group of UEs. The receiving unit 8002 may be configured to receive from the second network function, a response about whether the request is authorized.

FIG. 8B is a schematic showing units of the apparatus for a second network function, according to embodiments of the present disclosure.

As shown in FIG. 8B, for example, the apparatus for a second network function 300 may comprise: a receiving unit 8003, configured to receive, from a first network function, a request for providing by the first network function at least one service parameter for a terminal device; and a transmitting unit 8004, configured to transmit to the first network function, a response about whether the request is authorized.

For another example, the receiving unit 8003 may be configured to receive from a first network function a first request for providing at least one service parameter for a UE or a group of UEs. The transmitting unit 8004 may be configured to transmit a second request to a third network function to request whether the first network function is authorized to provide the at least one service parameter for the UE or the group of UEs. The receiving unit 8003 may be configured to receive from the third network function a response to the second request indicating a result of an authorization. The transmitting unit 8004 may be configured to transmit to the first network function a response about whether the first request is authorized.

Figure 8C:
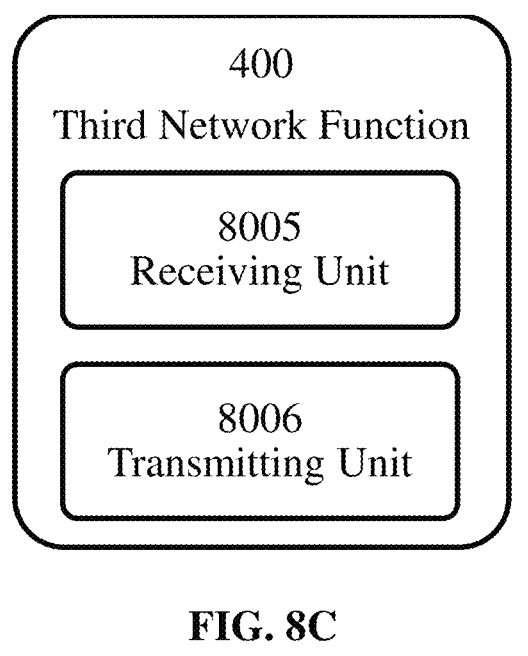

FIG. 8C is a schematic showing units of the apparatus for a third network function, according to embodiments of the present disclosure.

As shown in FIG. 8C, for example, the apparatus for a third network function 400 may comprise: a receiving unit 8005, configured to receive from a second network function, a request for providing by a first network function at least one service parameter for a terminal device; and a transmitting unit 8006, configured to transmit, to the second network function, a response about whether the request is authorized.

For another example, the receiving unit 8005 may be configured to receive a request for providing whether a first network function is authorized to provide at least one service parameter for a UE or a group of UEs. The transmitting unit 8006 may be configured to transmit to the second network function a response to indicate a result of an authorization.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the first network function 200, the second network function 300, and/or the third network function 400 may not need a fixed processor or memory, any computing resource and storage resource may be arranged from at least one network function/node/device/entity/apparatus in the communication system. The virtualization technology and network computing technology may be further introduced, so as to improve the usage efficiency of the network resources and the flexibility of the network.

Example embodiments of the present disclosure may further provide method implemented in a communication system.

According to embodiments of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station.

According to embodiments of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry.

According to embodiments of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry.

According to embodiments of the present disclosure, there is provided a method implemented in a communication system which may include a host computer, a base station and a UE. The method may comprise, at the host computer, receiving user data transmitted to the base station from the UE.

According to embodiments of the present disclosure, there is provided a communication system including a host computer. The host computer may comprise a communication interface configured to receive user data originating from a transmission from a UE to a base station. The UE may comprise a radio interface and processing circuitry.

According to embodiments of the present disclosure, there is provided a method implemented in a communication system which may include a host computer, a base station and a UE. The method may comprise, at the host computer, receiving, from the base station, user data originating from a transmission which the base station has received from the UE.

According to embodiments of the present disclosure, there is provided a communication system which may include a host computer. The host computer may comprise a communication interface configured to receive user data originating from a transmission from a UE to a base station. The base station may comprise a radio interface and processing circuitry.

Figure 9:
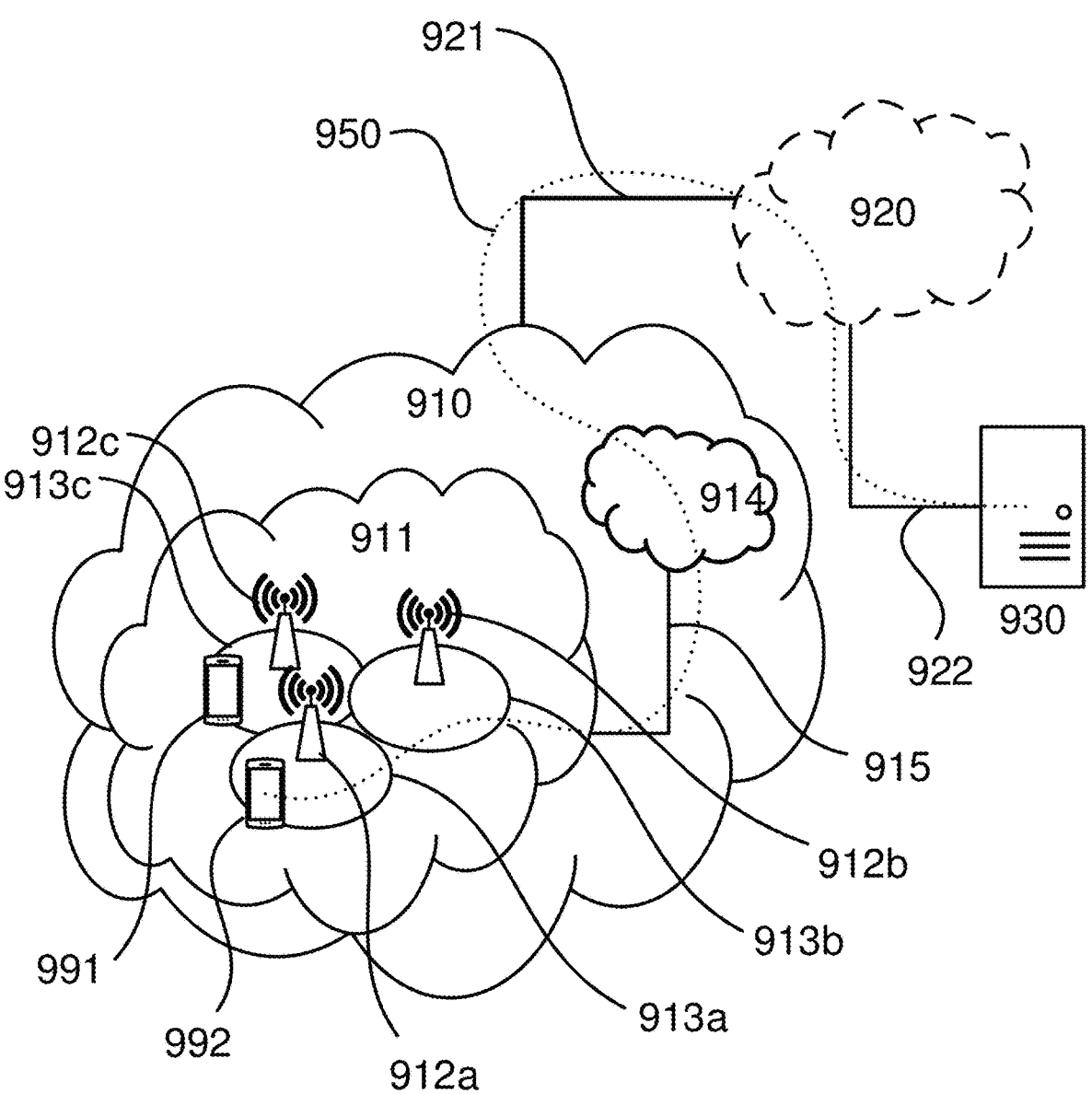
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more subnetworks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
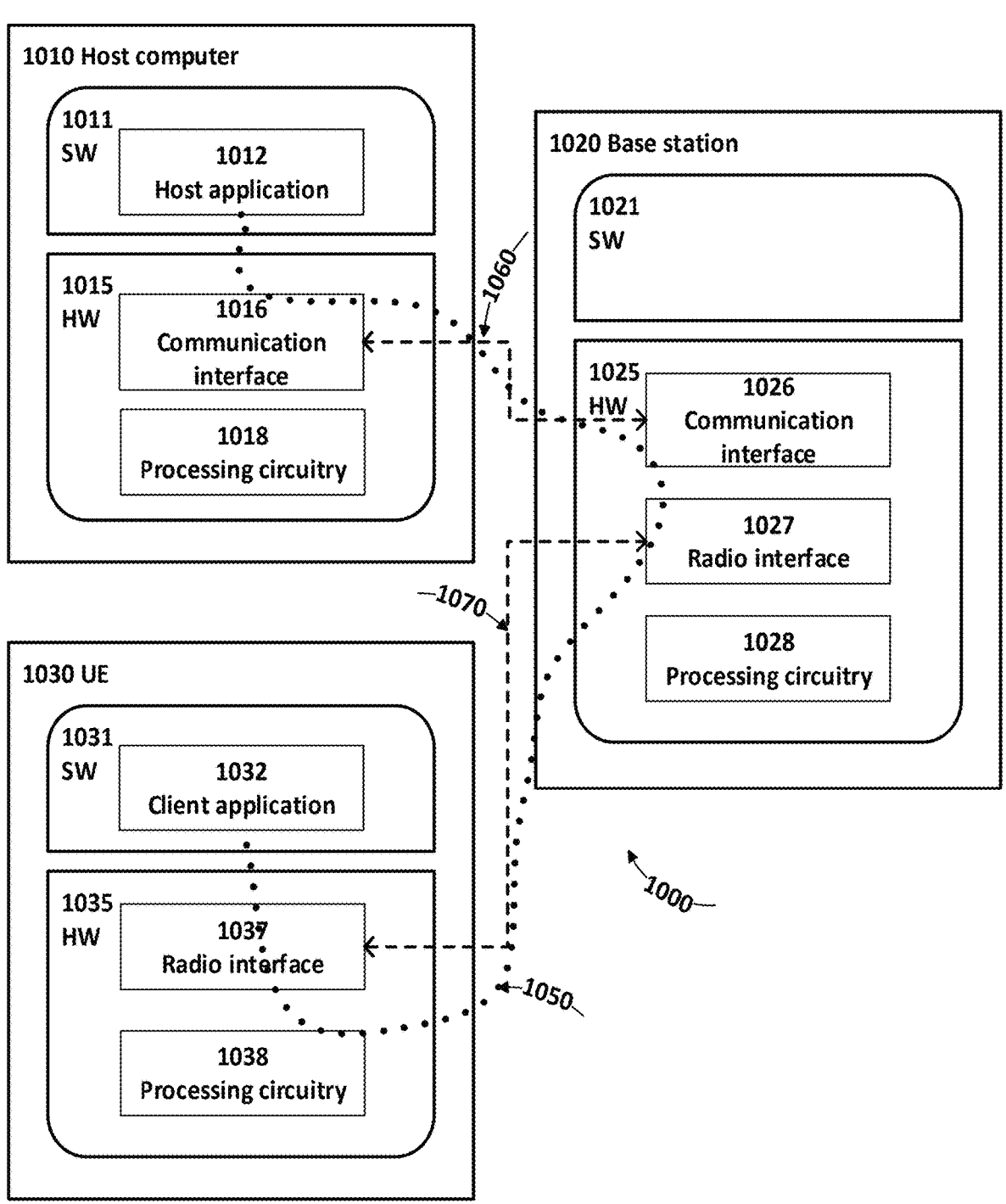
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
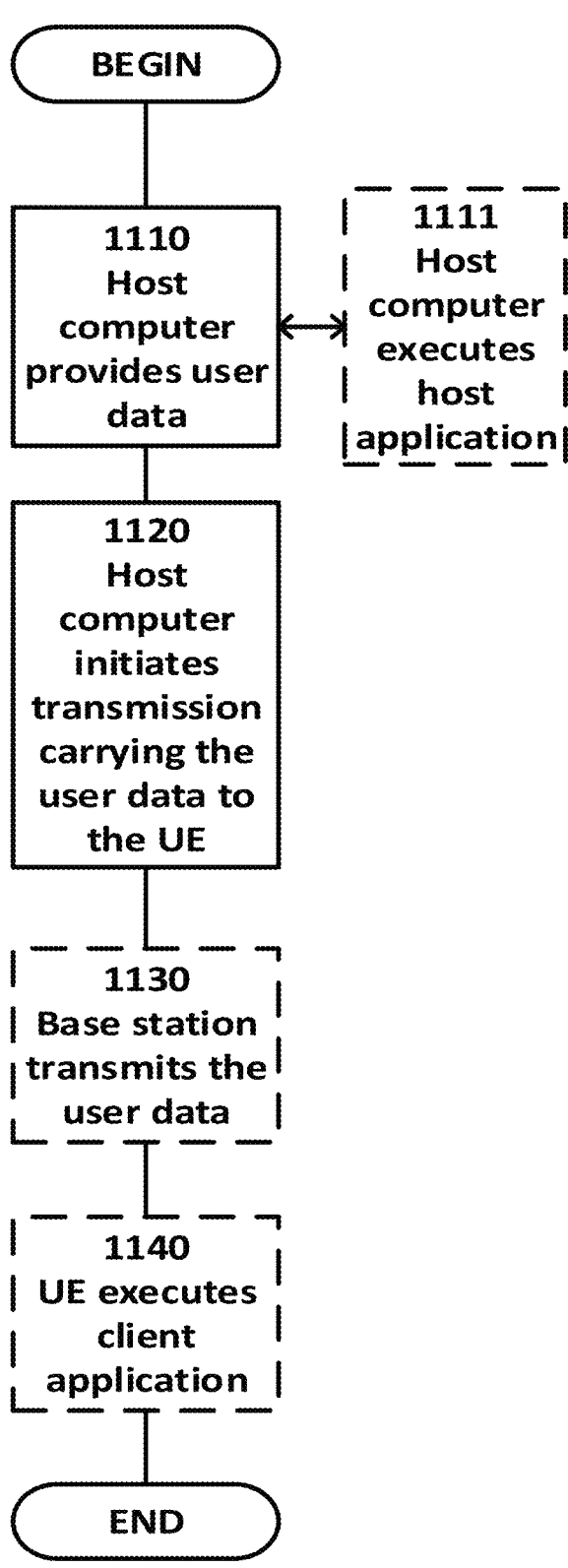
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
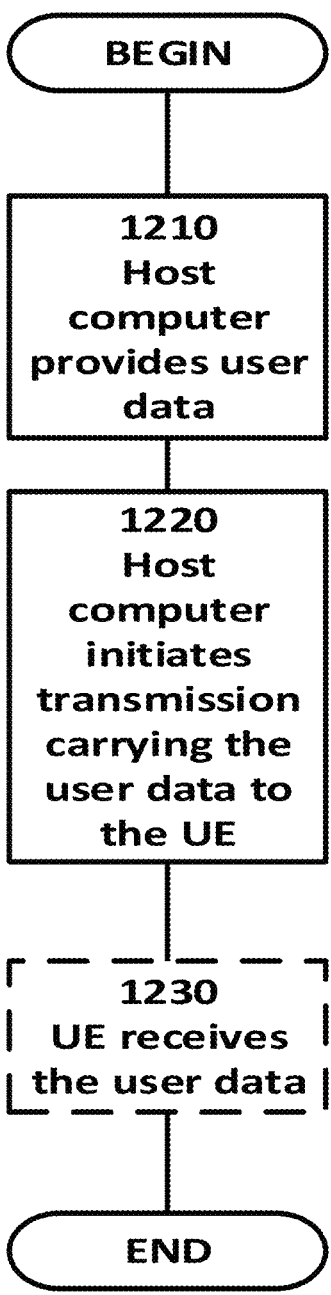
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
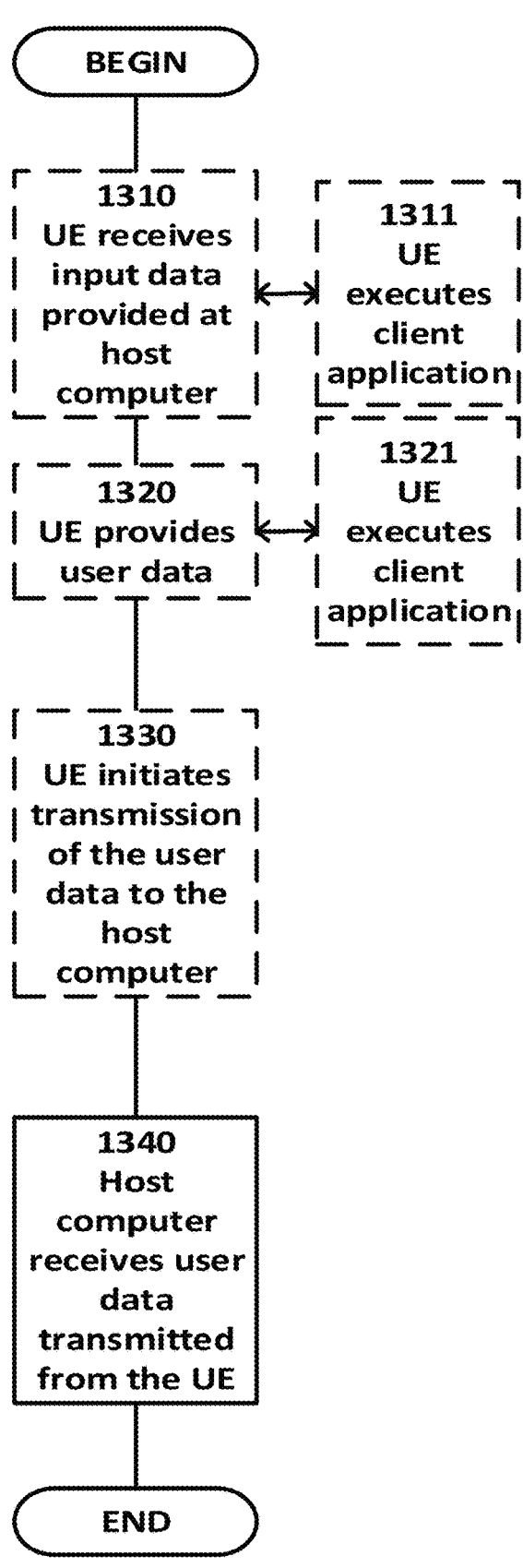
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
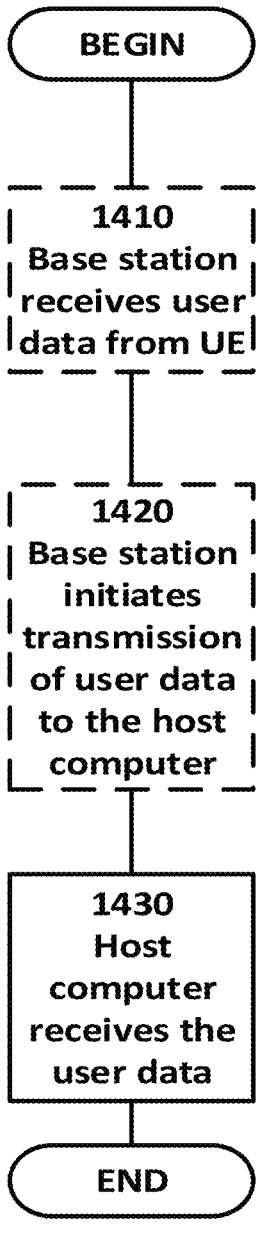
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first network function, comprising:

transmitting, to a second network function, a request for providing at least one service parameter for a user equipment (UE) or a group of UEs; and receiving, from the second network function, a response about whether the request is authorized, wherein the response includes a validity time for the at least one service parameter.

2. The method according to claim 1, wherein the request is authorized, when the at least one service parameter belongs to subscription data in a third network function;

wherein the third network function comprises a unified data management (UDM); or wherein the request is authorized, when the at least one service parameter belongs to subscription data in the third network function and the third network function comprises the UDM.

3. The method according to claim 1, wherein the at least one service parameter comprises:

an identity of a service;

an identity of the UE or the group of UEs; or both the identity of the service and the identity of the UE or the group of UEs.

4. The method according to claim 1, wherein the at least one service parameter comprises:

an identity of a service;

an identity of the UE or the group of UEs; or both the identity of the service and the identity of the UE or the group of UEs.

5. The method according to claim 4, wherein the at least one service parameter further comprises:

an identity of a service provider;

service-related data which is part of subscription data for the UE or the group of UEs; or the identity of the service provider and the service-related data which is part of the subscription data for the UE or the group of UEs;

wherein the service-related data comprises:

slicing information;

a data network name (DNN);

a single network slice selection assistance information (S-NSSAI); or any combination thereof.

6. The method according to claim 5, wherein the identity of a service is associated to any one of:

a UE route selection policy (URSP), or an application function (AF) session with quality of service (QoS), or an AF influenced traffic routing, or a Service Specific Parameter Provisioning, or a Service Area Restriction, or a Traffic Steering Policy which requires policy control function (PCF) policy evaluation; or wherein the service provider comprises an AF, or a machine type communication (MTC) Provider; or any combination thereof.

7. The method according to claim 6, wherein the request is authorized when a service indicated by the identity of the service is authorized for the UE or the group of UEs, or when the service-related data includes DNN, S-NSSAI, or both DNN and S-NSSAI, belonging to a list of subscribed DNNs and S-NSSAIs.

8. The method according to claim 1, wherein the first network function comprises an application function (AF);

wherein the second network function comprises a network exposure function (NEF); or wherein the first network function comprises the AF and the second network function comprises the NEF.

9. A method performed by a second network function, comprising:

receiving, from a first network function, a first request for providing at least one service parameter for a user equipment (UE) or a group of UEs;

transmitting a second request to a third network function to request whether the first network function is authorized to provide the at least one service parameter for the UE or the group of UEs;

receiving, from the third network function, a response to the second request indicating a result of an authorization; and transmitting, to the first network function, a response about whether the first request is authorized, wherein the response to the first request, the response to the second request, or both the response to the first request and the response to the second request, includes a validity time for the at least one service parameter.

10. The method according to claim 9, wherein the first request, the second request, or both the first request and the second request, is authorized, when the at least one service parameter belongs to subscription data in the third network function.

11. The method according to claim 9, wherein the third network function comprises a unified data management (UDM).

12. The method according to claim 10, further comprising:

storing the at least one service parameter in a fourth network function, when the first request, the second request, or both the first request and the second request is authorized;

wherein the fourth network function comprise a unified data repository (UDR); or wherein the at least one service parameter comprises:

an identity of a service;

an identity of the UE or of the group of UEs; or both the identity of the service and the identity of the UE or of the group of UEs; or any combination thereof.

13. The method according to claim 12, wherein the at least one service parameter further comprises:

an identity of a service provider;

service-related data which is part of subscription data for the UE or the group of UEs; or both the identity of the service provider and service-related data which is part of the subscription data for the UE or the group of UEs;

wherein the service-related data comprises slicing information, a data network name (DNN), a single network slice selection assistance information (S-NSSAI), or any combination thereof.

14. The method according to claim 13, wherein the identity of a service is associated to any one of:

a UE route selection policy (URSP), or an application function (AF) session with quality of service (QoS), or an AF influenced traffic routing, or a Service Specific Parameter Provisioning, or a Service Area Restriction, or a Traffic Steering Policy which requires policy control function (PCF) policy evaluation; or wherein the service provider comprises an AF, or a machine type communication (MTC) Provider; or any combination thereof.

15. The method according to claim 14, wherein the first request, the second request, or both the first request and the second request, is authorized when a service indicated by the identity of the service is authorized for the UE or the group of UEs, or when the service-related data includes DNN, S-NSSAI, or both DNN and S-NSSAI, belonging to a list of subscribed DNNs and S-NSSAIs.

16. The method according to claim 12, wherein the fourth network function notifies a fifth network function about the at least one service parameter.

17. The method according to claim 16, wherein the fifth network function comprises a policy control function, (PCF);

wherein the first network function comprises an application function (AF);

wherein the second network function comprises a network exposure function (NEF); or any combination thereof.

18. A first network function, comprising:

one or more processors; and one or more memories comprising computer program codes which, when executed by the one or more processors, cause the first network function to:

transmit, to a second network function, a request for providing at least one service parameter for a user equipment (UE) or a group of UEs; and receive, from the second network function, a response about whether the request is authorized, wherein the response includes a validity time for the at least one service parameter.

19. A second network function, comprising:

one or more processors; and one or more memories comprising computer program codes which, when executed by the one or more processors, cause the second network function to:

receive, from a first network function, a first request for providing at least one service parameter for a user equipment (UE) or a group of UEs;

transmit a second request to a third network function to request whether the first network function is authorized to provide the at least one service parameter for the UE or the group of UEs;

receive, from the third network function, a response to the second request indicating a result of an authorization; and transmit, to the first network function, a response about whether the first request is authorized, wherein the response to the first request, the response to the second request, or both the response to the first request and the response to the second request, includes a validity time for the at least one service parameter.

* * * * *